United States Patent [19]

Petreye et al.

[11] Patent Number: 5,493,282
[45] Date of Patent: Feb. 20, 1996

[54] ADDRESSING METHOD FOR CONSERVING POWER IN DISTRIBUTED INFORMATION RECEIVERS

[75] Inventors: David R. Petreye, Lake Worth; David F. Willard, Plantation, both of Fla.

[73] Assignee: Motorola, Inc., Schaumburg, Ill.

[21] Appl. No.: 100,863

[22] Filed: Aug. 2, 1993

Related U.S. Application Data

[63] Continuation-in-part of Ser. No. 908,271, Jul. 2, 1992, abandoned, which is a continuation-in-part of Ser. No. 891,363, May 29, 1992, abandoned.

[51] Int. Cl.⁶ ................................................. H04Q 9/00
[52] U.S. Cl. ................... 340/825.27; 340/825.44
[58] Field of Search .............. 340/825.27, 825.44, 340/825.47, 825.48, 825.26, 311.1; 455/38.3, 343

[56] References Cited

U.S. PATENT DOCUMENTS

| | | | |
|---|---|---|---|
| 4,839,639 | 6/1989 | Sato et al. | 340/825.44 |
| 4,849,750 | 7/1989 | Andros et al. | 340/825.44 |
| 5,049,874 | 9/1991 | Ishida et al. | 340/825.44 |
| 5,144,296 | 9/1992 | DeLuca et al. | 340/825.44 |

*Primary Examiner*—Donald J. Yusko
*Assistant Examiner*—Edwin C. Holloway, III
*Attorney, Agent, or Firm*—Philip P. Macnak; John H. Moore; Daniel K. Nichols

[57] ABSTRACT

A communication receiver (106) receives an address code word (1800) of a transmitted message, the message comprising the address code word (1800) and an associated data portion (1610), the address code word comprising an address portion (1802,1804). The communication receiver (106) corrects (2104) up to a predetermined number of bit errors in the received address code word (1800). The communication receiver (106) can conserve power following a failed correction of the address code word (1800). Alternatively, the communication receiver (106) compares (2108, 2111) the address portion (1802,1804) of the corrected address code word (1800) to at least one predetermined subscription address (1704,1706). The communication receiver (106) can conserve power following a determination of no match (2110,2114,2308) between the address portion (1802,1804) of the corrected address code word (1800) and the at least one predetermined subscription address (1704,1706).

7 Claims, 16 Drawing Sheets

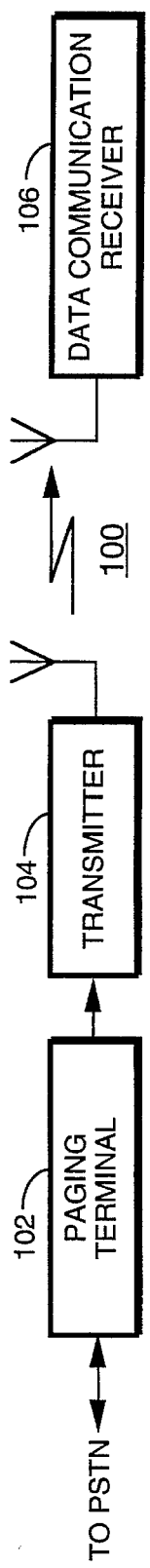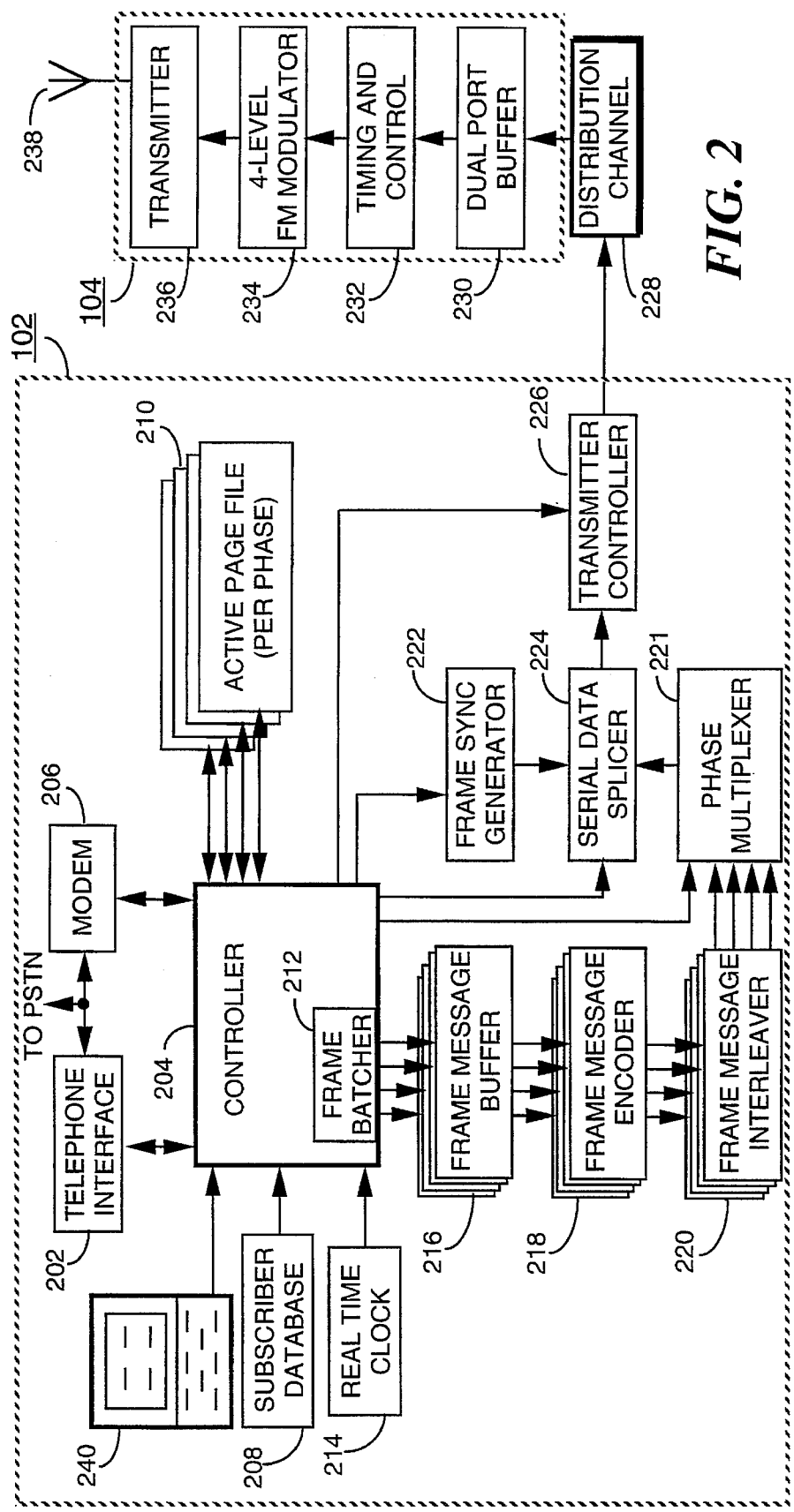

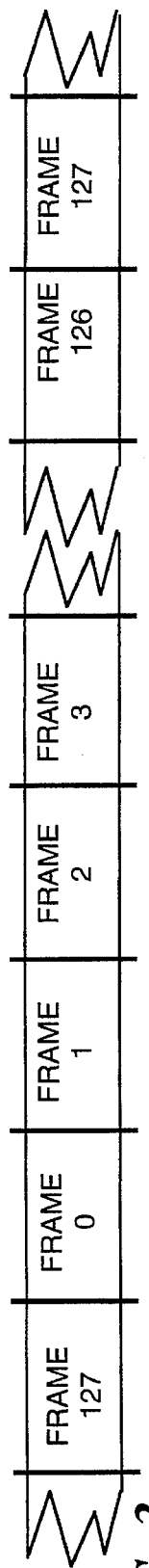
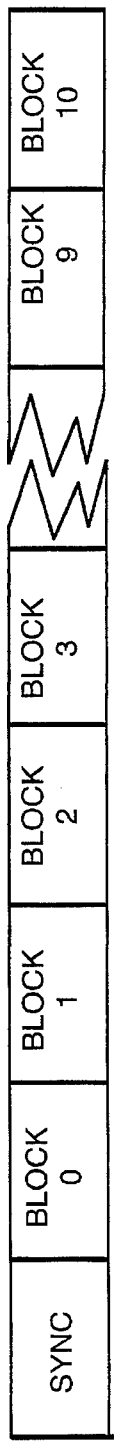
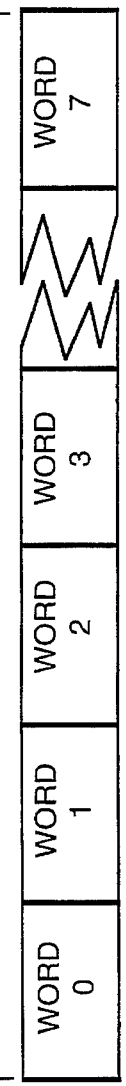
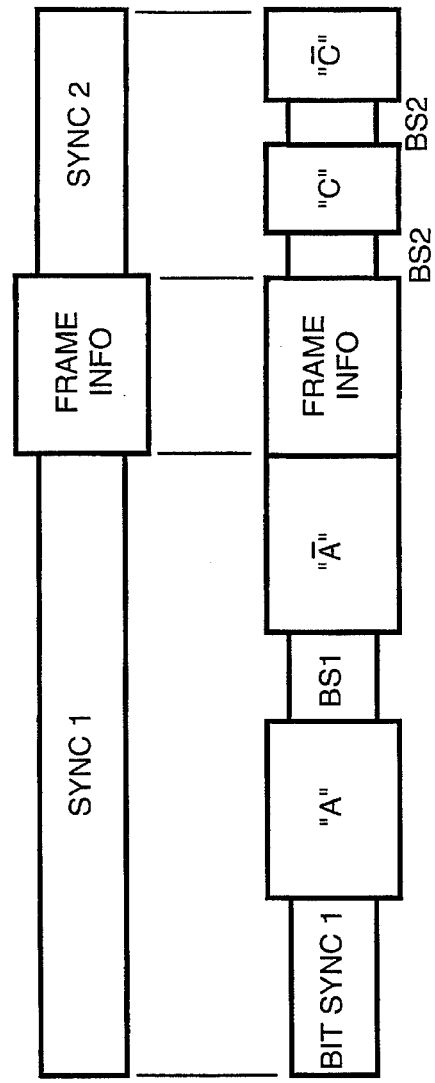
*FIG. 3*
*FIG. 4*
*FIG. 5*
*FIG. 6*
*FIG. 7*

ADDRESSING METHOD FOR CONSERVING POWER IN DISTRIBUTED INFORMATION RECEIVERS

This application is a continuation-in-part application of patent application Ser. No. 7/908,271, filed Jul. 2, 1992 by David. R. Petreye, entitled "Power Conservation Method And Apparatus For A Data Communication Receiver", now abandoned, which is a continuation-in-part application of patent application Ser. No. 7/891,363, filed May 29, 1992 by Schwendeman et al., entitled "Data Communication Receiver having Variable Length Message Carry-On" now abandoned.

FIELD OF THE INVENTION

The present invention relates generally to the field of addressed messaging communication systems, and more particularly to an addressing method for conserving power in distributed communication receivers in an information distribution system.

BACKGROUND OF THE INVENTION

Conserving power is particularly important in portable communication receivers which are typically powered by battery power or other depletable power source. Typically, an information distribution system periodically transmits large amounts of information to distributed communication receivers. The large volume of transmitted information per transmission batch and the large number of transmissions over time can require the communication receivers to receive and process the transmitted information and consequently consume power most of the time. This can seriously reduce the battery life of the communication receivers. Short battery life normally equates to requiring the users of the communication receivers to replenish the batteries or other depletable power source in the communication receivers more often than would reasonably be acceptable by the users. Besides the detrimental economic impact and the inconvenience of replacing the power source affecting the users, the added waste of the depleted batteries can be an environmentally unacceptable byproduct.

Generally, the communication receiver receives the transmitted information, determines whether the communication receiver has subscribed to the particular transmitted information, and then, if subscribed to, stores the transmitted information into a memory for subsequent retrieval by a user of the communication receiver. For example, a distributed population of paging receivers may subscribe to one or more different information categories, e.g., weather, stock, sports, news, etc., from a very large selection, and possibly from more than one information service provider. Each one of the many subscription categories of the information service provider typically is uniquely identifiable to the subscribing paging receivers. Each paging receiver can selectively "detect" only the "subscribed to" information message, e.g., by detecting an address coupled with the transmitted information. The paging receiver attempts to conserve power and extend battery life by turning off unnecessary electronic circuits when the information message is not destined for the particular paging receiver. This continuous process of receiving information and determining whether the communication receiver subscribed to the particular transmitted information can rapidly deplete the power of a power source, e.g., a battery, because more often than not the communication receiver is.

Although a number of battery saving techniques have been utilized to generally conserve power in communication receivers while detecting an address of a transmission, information distribution communication systems have specific requirements that tend to conflict with the goal of maximizing power conservation. For example, each communication receiver may want to subscribe to a large number of information subscriptions from one or more information service providers. Further, for transmission efficiency, each information subscription may be embedded in a larger information transmission batch, where each information subscription is identified by an address also embedded in the batch. All the communication receivers subscribing to a particular information subscription must search for the particular subscription address to detect the transmission of the information subscription. While searching for the particular address in large information transmission batches that are being periodically transmitted the communication receivers can consume significant amounts of power from their power sources.

For example, one approach has been to include sub-addressing information in a data portion of a long transmitted message. That is, a communication receiver would detect an address in the message, such as to identify the general information service provider, and subsequently would search the length of a long data portion of the message to identify whether any subscriptions are transmitted within the transmission. These subscriptions comprised sub-addresses followed by corresponding information data for each sub-address, all within the data portion of the message. One communication system of the general type discussed above is disclosed in International Application Number PCT/US88/01581, which was published on Nov. 17, 1988 having the International Publication Number WO 88/09104, by the inventors Fascenda et al.

This approach has experienced the significant drawback of requiring the distributed communication receivers to search, and consequently stay ON for, the data portion of the message even if the message had no subscriptions for the particular communication receiver. Therefore, battery life has suffered in those communication receivers subscribing to the information service provider.

An alternative approach can be to provide many different addresses to the general information service provider, one address for each of the many subscriptions in the service. Unfortunately, conventional communication receivers subscribing to anything more than a small number of subscriptions would be overwhelmed by the processing power required to decode all the potential addresses corresponding to their subscriptions.

Therefore, this addressing limitation can pose a severe limitation to the information service provider attempting to provide a rich selection of services for customers. The necessity for maximizing the availability of subscriptions and services to potential customers is obvious in today's competitive marketplace.

Thus, there is a need to provide a distributed information communication system enabling communication receivers to selectively receive large numbers of information subscriptions while conserving power at the communication receiver.

SUMMARY OF THE INVENTION

According to an embodiment of the present invention, there is provided a method for decoding a transmitted message in a communication receiver, the message comprising an address code word and an associated data portion, the address code word comprising an address portion. The communication receiver receives an address code word of a transmitted message, and then corrects up to a predetermined number of bit errors in the received address code word. The communication receiver can conserve power during at least one of until a subsequent address code word is expected to be received, and during the data portion of the transmitted message following a failed correction of the address code word. Alternatively, the communication receiver compares the address portion of the corrected address code word to at least one predetermined subscription address. The communication receiver can conserve power during at least one of until a subsequent address code word is expected to be received, and during the data portion of the transmitted message following a determination of no match between the address portion of the corrected address code word and the at least one predetermined subscription address.

BRIEF DESCRIPTION OF THE DRAWINGS

FIG. 1 is an electrical block diagram of a data transmission system in accordance with the preferred embodiment of the present invention.

FIG. 2 is an electrical block diagram of a terminal for processing and transmitting message information in accordance with the preferred embodiment of the present invention.

FIGS. 3 to 5 are timing diagrams illustrating the transmission format of the signaling protocol utilized in accordance with the preferred embodiment of the present invention.

FIGS. 6 and 7 are timing diagrams illustrating the synchronization signals utilized in accordance with the preferred embodiment of the present invention.

DESCRIPTION OF A PREFERRED EMBODIMENT

Figure 8:
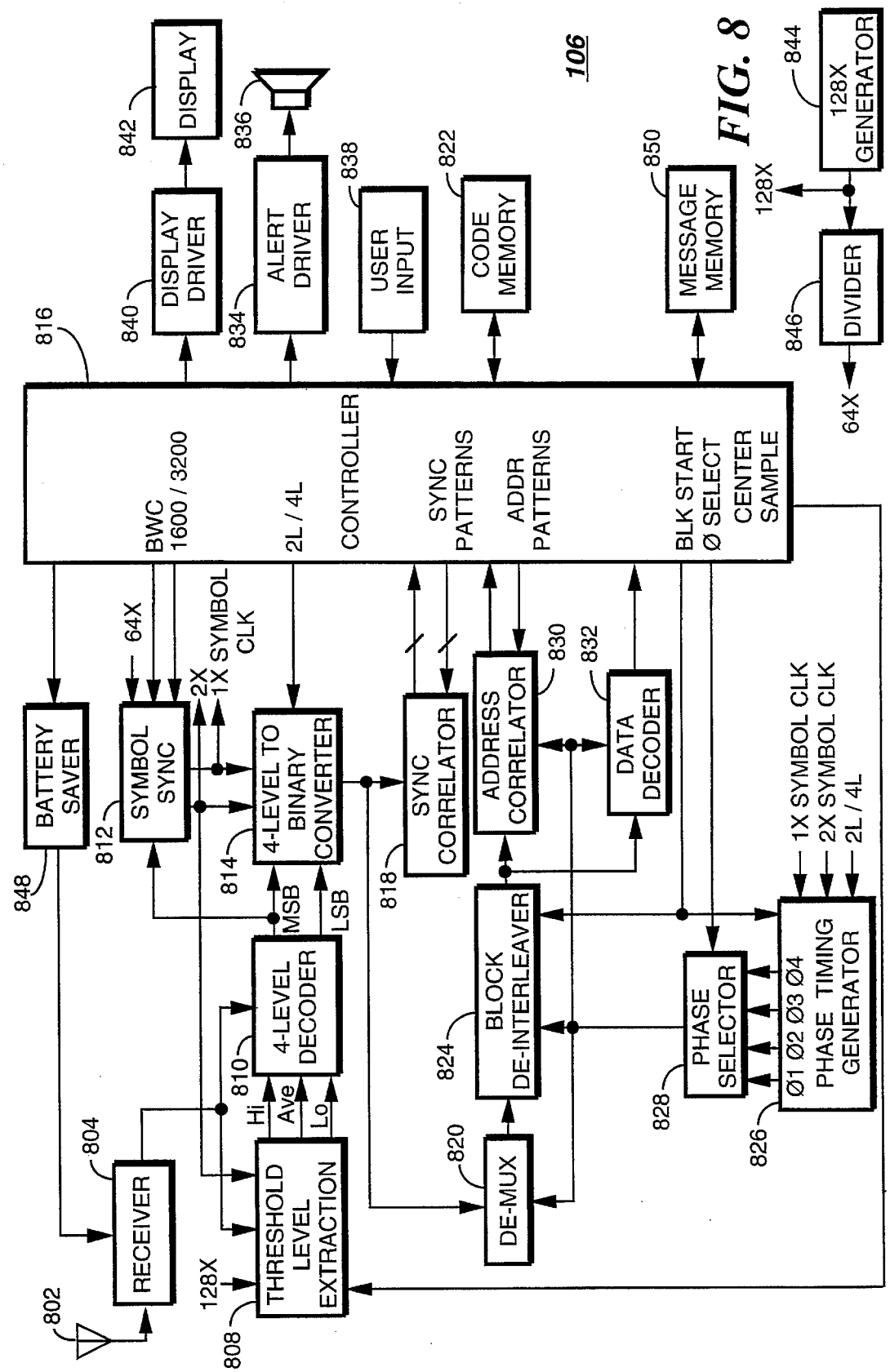
FIG. 8 is an electrical block diagram of a data communication receiver in accordance with the preferred embodiment of the present invention.

FIG. 1 is an electrical block diagram of a data transmission system 100, such as a paging system, in accordance with the preferred embodiment of the present invention. In such a data transmission system 100, messages originating either from a phone, as in a system providing numeric data transmission, or from a message entry device, such as an alphanumeric data terminal, are routed through the public switched telephone network (PSTN) to a paging terminal 102 which processes the numeric or alphanumeric message information for transmission by one or more transmitters 104 provided within the system. When multiple transmitters are utilized, the transmitters 104 preferably simulcast transmit the message information to data communication receivers 106. These data communication receivers 106 can operate as selective call receivers, as will be discussed below. Processing of the numeric and alphanumeric information by the paging terminal 102, and the protocol utilized for the transmission of the messages is also described below.

FIG. 2 is an electrical block diagram of the paging terminal 102 utilized for processing and controlling the transmission of the message information in accordance with the preferred embodiment of the present invention. Short messages, such as tone-only and numeric messages which can be readily entered using a Touch-Tone telephone are coupled to the paging terminal 102 through a telephone interface 202 in a manner well known in the art. Longer messages, such as alphanumeric messages which require the use of a data entry device are coupled to the paging terminal 102 through a modem 206 using any of a number of well known modem transmission protocols. When a call to place a message is received, a controller 204 handles the processing of the message. The controller 204 is preferably a microcomputer, such as an MC68000 or equivalent, which is manufactured by Motorola Inc., and which runs various pre-programmed routines for controlling such terminal operations as voice prompts to direct the caller to enter the message, or the handshaking protocol to enable reception of messages from a data entry device. When a call is received, the controller 204 references information stored in the subscriber database 208 to determine how the message being received is to be processed. The subscriber data base 208 includes, but is not limited to such information as addresses assigned to the data communication receiver, message type associated with the address, and information related to the status of the data communication receiver, such as active or inactive for failure to pay the bill. A data entry terminal 240 is provided which couples to the controller 204, and which is used for such purposes as entry, updating and deleting of information stored in the subscriber data base 208, for monitoring system performance, and for obtaining such information as billing information.

The subscriber database 208 also includes such information as to what transmission frame and to what transmission phase the data communication receiver is assigned, as will be described in further detail below. The received message is stored in an active page file 210 which stores the messages in queues according to the transmission phase assigned to the data communication receiver. In the preferred embodiment of the present invention, four phase queues are provided in the active page file 210. The active page file 210 is preferably a dual port, first in first out random access memory, although it will be appreciated that other random access memory devices, such as hard disk drives, can be utilized as well. Periodically the message information stored in each of the phase queues is recovered from the active page file 210 under control of controller 204 using timing information such as provided by a real time clock 214, or other suitable timing source. The recovered message information from each phase queue is sorted by frame number and is then organized by address, message information, and any other information required for transmission, and then batched into frames based upon message size by frame batching controller 212. The batched frame information for each phase queue is coupled to frame message buffers 216 which temporarily store the batched frame information until a time for further processing and transmission. Frames are batched in numeric sequence, so that while a current frame is being transmitted, the next frame to be transmitted is in the frame message buffer 216, and the next frame thereafter is being retrieved and batched. At the appropriate time, the batched frame information stored in the frame message buffer 216 is transferred to the frame encoder 218, again maintaining the phase queue relationship. The frame encoder 218 encodes the address and message information into address and message code words required for transmission, as will be described below. The encoded address and message code words are ordered into blocks and then coupled to a block interleaver 220 which interleaves preferably eight code words at a time for transmission in a manner well known in the art. The interleaved code words from each block interleaver 220 are then serially transferred to a phase multiplexer 221, which multiplexes the message information on a bit by bit basis into a serial data stream by transmission phase. The controller 204 next enables a frame sync generator 222 which generates the synchronization code which is transmitted at the start of each frame transmission. The synchronization code is multiplexed with address and message information under the control of controller 204 by serial data splicer 224, and generates therefrom a message stream which is properly formatted for transmission. The message stream is next coupled to a transmitter controller 226, which under the control of controller 204 transmits the message stream over a distribution channel 228. The distribution channel 228 may be any of a number of well known distribution channel types, such as wire line, an RF or microwave distribution channel, or a satellite distribution link. The distributed message stream is transferred to one or more transmitter stations 104, depending upon the size of the communication system. The message stream is first transferred into a dual port buffer 230 which temporarily stores the message stream prior to transmission. At an appropriate time determined by timing and control circuit 232, the message stream is recovered from the dual port buffer 230 and coupled to the input of preferably a 4-level FSK modulator 234. The modulated message stream is then coupled to the transmitter 236 for transmission via antenna 238.

FIGS. 3, 4 and 5 are timing diagrams illustrating the transmission format of the signaling protocol utilized in accordance with the preferred embodiment of the present invention. As shown in FIG. 3, the signaling protocol enables message transmission to data communication receivers, such as pagers, assigned to one or more of 128 frames which are labeled frame 0 through frame 127. It then will be appreciated that the actual number of frames provided within the signaling protocol can be greater or less than described above. The greater the number of frames utilized, the greater the battery life that may be provided to the data communication receivers operating within the system. The fewer the number of frames utilized, the more often messages can be queued and delivered to the data communication receivers assigned to any particular frame, thereby reducing the latency, or time required to deliver messages.

As shown in FIG. 4, the frames comprise a synchronization code (sync) followed preferably by eleven blocks of message information which are labeled block 0 through block 10. As shown in FIG. 5. each block of message information comprises preferably eight address, control or data code words which are labeled word 0 through word 7 for each phase. Consequently, each phase in a frame allows the transmission of up to eighty-eight address, control and data code words. The address, control and data code words are preferably 31,21 BCH code words with an added thirty-second even parity bit which provides an extra bit of distance to the code word set. It will be appreciated that other code words, such as a 23,12 Golay code word could be utilized as well. Unlike the well known POCSAG signaling protocol which provides address and data code words which utilize the first code word bit to define the code word type, as either address or data, no such distinction is provided for the address and data code words in the signaling protocol utilized with the preferred embodiment of the present invention. Rather, address and data code words are defined by their position within the individual frames.

FIGS. 6 and 7 are timing diagrams illustrating the synchronization code utilized in accordance with the preferred embodiment of the present invention. In particular, as shown in FIG. 6, the synchronization code comprises preferably three parts, a first synchronization code (sync 1), a frame information code word (frame info) and a second synchronization code (sync 2). As shown in FIG. 7, the first synchronization code comprises first and third portions, labeled bit sync 1 and BS1, which are alternating 1,0 bit patterns which provides bit synchronization, and second and fourth portions, labeled "A" and its complement "A bar", which provide frame synchronization. The second and fourth portions are preferably single 32,21 BCH code words which are predefined to provide high code word correlation reliability, and which are also used to indicate the data bit rate at which addresses and messages are transmitted. The table below defines the data bit rates which are used in conjunction with the signaling protocol.

| Bit Rate | "A" Value |
| --- | --- |
| 1600 bps | A1 and A1 bar |
| 3200 bps | A2 and A2 bar |

7
-continued

| Bit Rate | "A" Value |
|---|---|
| 6400 bps | A3 and A3 bar |
| Not defined | A4 and A4 bar |

As shown in the table above, three data bit rates are predefined for address and message transmission, although it will be appreciated that more or less data bit rates can be predefined as well, depending upon the system requirements. A fourth "A" value is also predefined for future use.

The frame information code word is preferably a single 32,21 BCH code word which includes within the data portion a predetermined number of bits reserved to identify the frame number, such as 7 bits encoded to define frame number 0 to frame number 127.

The structure of the second synchronization code is preferably similar to that of the first synchronization code described above. However, unlike the first synchronization code which is preferably transmitted at a fixed data symbol rate, such as 1600 bps (bits per second), the second synchronization code is transmitted at the data symbol rate at which the address and messages are to be transmitted in any given frame. Consequently, the second synchronization code allows the data communication receiver to obtain "fine" bit and frame synchronization at the frame transmission data bit rate.

In summary the signaling protocol utilized with the preferred embodiment of the present invention comprises 128 frames which include a predetermined synchronization code followed by eleven data blocks which comprise eight address, control or message code words per phase. The synchronization code enables identification of the data transmission rate, and insures synchronization by the data communication receiver with the data code words transmitted at the various transmission rates.

FIG. 8 is an electrical block diagram of the data communication receiver 106 in accordance with the preferred embodiment of the present invention. The heart of the data communication receiver 106 is a controller 816, which is preferably implemented using an MC68HC05HC11 microcomputer, such as manufactured by Motorola, Inc. The microcomputer controller, hereinafter call the controller 816, receives and processes inputs from a number of peripheral circuits, as shown in FIG. 8, and controls the operation and interaction of the peripheral circuits using software subroutines. The use of a microcomputer controller for processing and control functions is well known to one of ordinary skill in the art.

Figure 9:
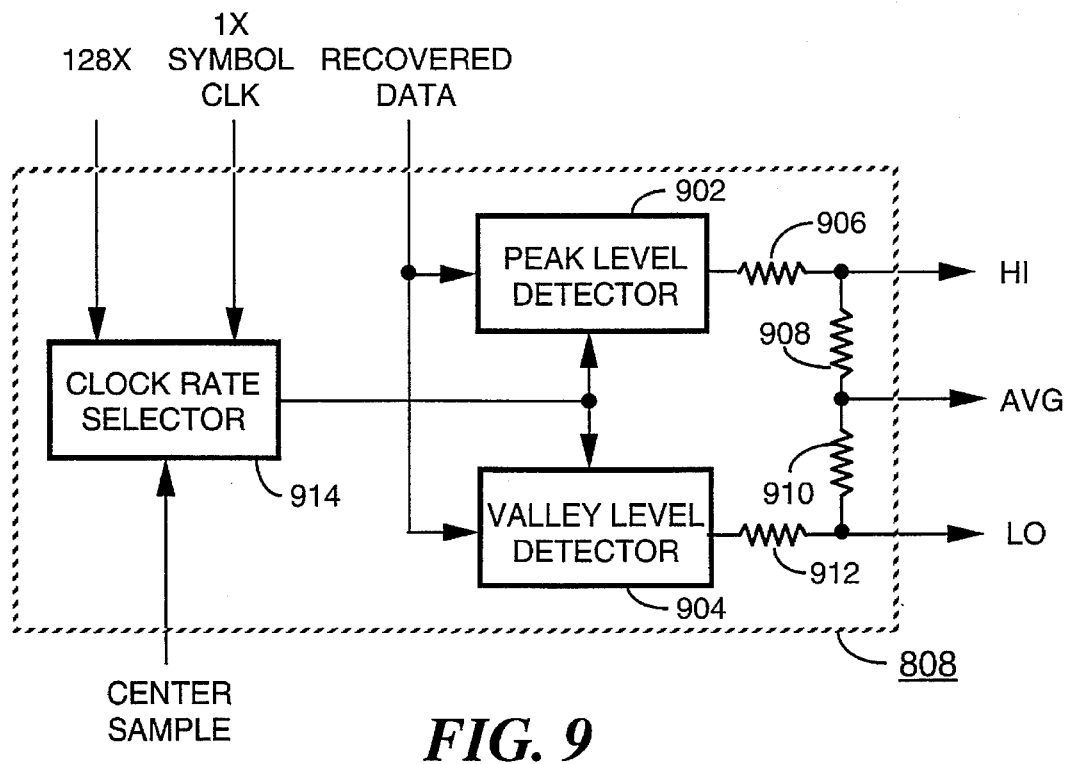
FIG. 9 is an electrical block diagram of a threshold level extraction circuit utilized in the data communication receiver of FIG. 8.

The data communication receiver 106 is capable of receiving address, control and message information, hereafter called "data" which is modulated using preferably 2-level and 4-level frequency modulation techniques. The transmitted data is intercepted by an antenna 802 which couples to the input of a receiver section 804. Receiver section 804 processes the received data in a manner well known in the art, providing at the output an analog 4-level recovered data signal, hereafter called a recovered data signal. The recovered data signal is coupled to one input of a threshold level extraction circuit 808, and to an input of a 4-level decoder 810. The threshold level extraction circuit 808 is best understood by referring to FIG. 9, and as shown comprises two clocked level detector circuits 902, 904 which have as inputs the recovered data signal. Level detector 902 detects the peak signal amplitude value and provides a high peak threshold signal which is proportional to the detected peak signal amplitude value, while level detector 904 detects the valley signal amplitude value and provides a valley threshold signal which is proportional to the detected valley signal amplitude value of the recovered data signal. The level detector 902, 904 signal outputs are coupled to terminals of resistors 906, 912, respectively. The opposite resistor terminals 906, 912 provide the high threshold output signal (Hi), and the low threshold output signal (Lo), respectively. The opposite resistor terminals 906, 912 are also coupled to terminals of resistors 908, 910, respectively. The opposite resistor 908, 910 terminals are coupled together to form a resistive divider which provides an average threshold output signal (Avg) which is proportional to the average value of the recovered data signal. Resistors 906, 912 have resistor values preferably of 1R, while resistors 908, 910 have resistor values preferably of 2R, realizing threshold output signal values of 17%, 50% and 83%, and which are utilized to enable decoding the 4-level data signals as will be described below.

When power is initially applied to the receiver portion, as when the data communication receiver is first turned on, a clock rate selector 914 is preset through a control input (center sample) to select a 128X clock, i.e. a clock having a frequency equivalent to 128 times the slowest data bit rate, which as described above is 1600 bps. The 128X clock is generated by 128X clock generator 844, as shown in FIG. 8, which is preferably a crystal controlled oscillator operating at 204.8 KHz (kilohertz). The output of the 128X clock generator 844 couples to an input of frequency divider 846 which divides the output frequency by two to generate a 64X clock at 102.4 KHz. Returning to FIG. 9, the 128X clock allows the level detectors 902, 904 to asynchronously detect in a very short period of time the peak and valley signal amplitude values, and to therefore generate the low (Lo), average (Avg) and high (Hi) threshold output signal values required for modulation decoding. After symbol synchronization is achieved with the synchronization signal, as will be described below, the controller 816 generates a second control signal (Center Sample) to enable selection of a 1X symbol clock which is generated by symbol synchronizer 812 as shown in FIG. 8.

Figure 10:
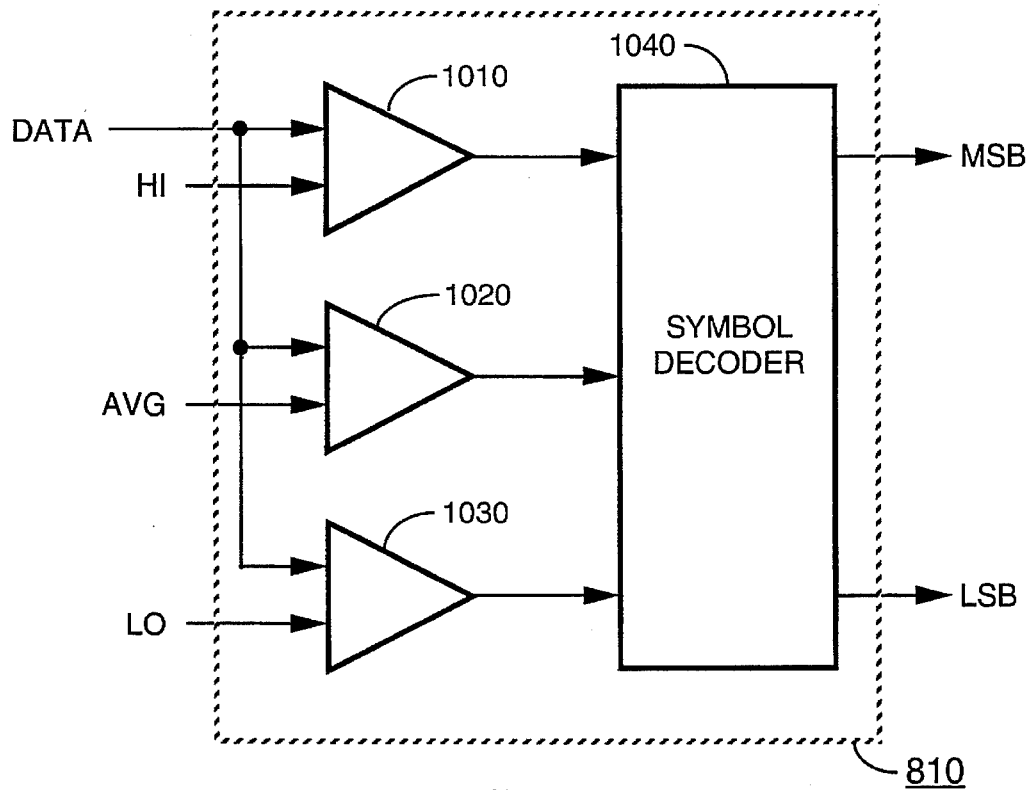
FIG. 10 is an electrical block diagram of a 4-level decoder utilized in the data communication receiver of FIG. 8.

Returning to FIG. 8, the 4-level decoder 810 operation is best understood by referring to FIG. 10. As shown, the 4-level decoder 810 comprises three voltage comparators 1010, 1020, 1030 and a symbol decoder 1040. The recovered data signal couples to an input of the three comparators 1010, 1020, 1030. The high threshold output signal (Hi) couples to the second input of comparator 1010, the average threshold output signal (Avg) couples to the second input of comparator 1020, and the low threshold output signal (Lo) couples to the second input of comparator 1030. The outputs of the three comparators 1010, 1020, 1030 couple to inputs of symbol decoder 1040. The symbol decoder 1040 decodes the inputs according to the table provided below.

| | Threshold | | | Output | |
|---|---|---|---|---|---|
| Hi | Avg | Lo | | MSB | LSB |
| $RC_{in} <$ | $RC_{in} <$ | $RC_{in} <$ | | 0 | 0 |
| $RC_{in} <$ | $RC_{in} <$ | $RC_{in} >$ | | 0 | 1 |
| $RC_{in} <$ | $RC_{in} >$ | $RC_{in} >$ | | 1 | 1 |
| $RC_{in} >$ | $RC_{in} >$ | $RC_{in} >$ | | 1 | 0 |

As shown in the table above, when the recovered data signal ($RC_{in}$) is less than all three threshold values, the symbol generated is 00 (MSB=0, LSB=0). Thereafter, as each of the three threshold values is exceeded, a different symbol is generated, as shown in the table above.

The MSB output from the 4-level decoder 810 is coupled to an input of the symbol synchronizer 812 and provides a recovered data input generated by detecting the zero crossings in the 4-level recovered data signal. The positive level of the recovered data input represents the two positive deviation excursions of the analog 4-level recovered data signal above the average threshold output signal, and the negative level represents the two negative deviation excursions of the analog 4-level recovered data signal below the average threshold output signal.

Figure 11:
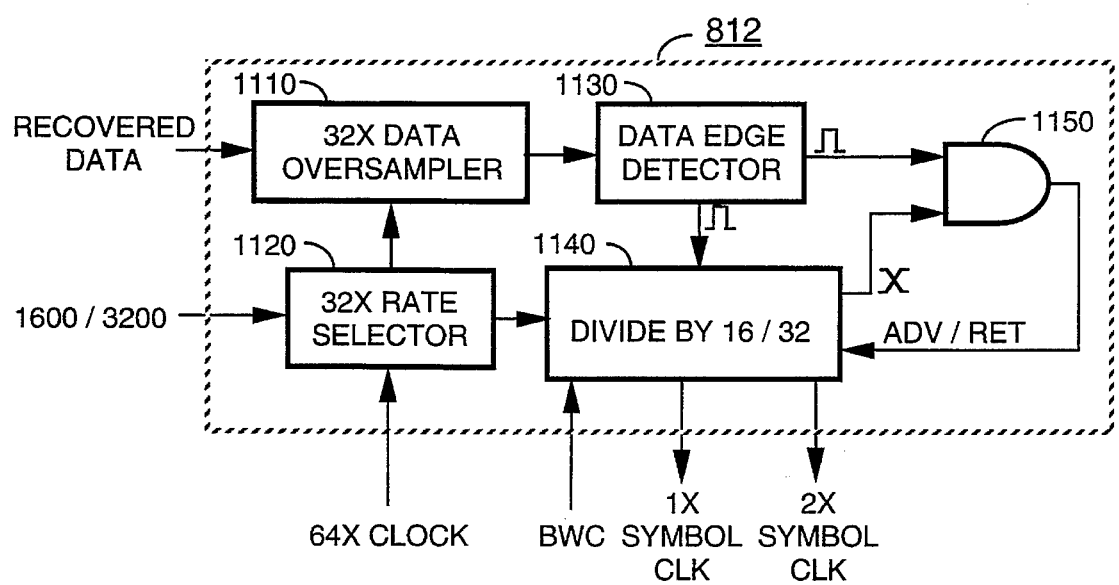
FIG. 11 is an electrical block diagram of a symbol synchronizer utilized in the data communication receiver of FIG. 8.

The operation of the symbol synchronizer 812 is best understood by referring to FIG. 11. The 64X clock at 102.4 KHz which is generated by frequency divider 846, is coupled to an input of a 32X rate selector 1120. The 32X rate selector 1120 is preferably a divider which provides selective division by 1 or 2 to generate a sample clock which is thirty-two times the symbol transmission rate. A control signal (1600/3200) is coupled to a second input of the 32X rate selector 1120, and is used to select the sample clock rate for symbol transmission rates of 1600 and 3200 symbols per second. The selected sample clock is coupled to an input of 32X data oversampler 1110 which samples the recovered data signal (MSB) at thirty-two samples per symbol. The symbol samples are coupled to an input of a data edge detector 1130 which generates an output pulse when a symbol edge is detected. The sample clock is also coupled to an input of a divide-by-16/32 circuit 1140 which is utilized to generate 1X and 2X symbol clocks synchronized to the recovered data signal. The divided-by-16/32 circuit 1140 is preferably an up/down counter. When the data edge detector 1130 detects a symbol edge, a pulse is generated which is gated by AND gate 1150 with the current count of divide-by-16/32 circuit 1140. Concurrently, a pulse is generated by the data edge detector 1130 which is also coupled to an input of the divide-by-16/32 circuit 1140. When the pulse coupled to the input of AND gate 1150 arrives before the generation of a count of thirty-two by the divide-by-16/32 circuit 1140, the output generated by AND gate 1150 causes the count of divide-by-16/32 circuit 1140 to be advanced by one count in response to the pulse which is coupled to the input of divide-by-16/32 circuit 1140 from the data edge detector 1130, and when the pulse coupled to the input of AND gate 1150 arrives after the generation of a count of thirty-two by the divide-by-16/32 circuit 1140, the output generated by AND gate 1150 causes the count of divide-by-16/32 circuit 1140 to be retarded by one count in response to the pulse which is coupled to the input of divide-by-16/32 circuit 1140 from the data edge detector 1130, thereby enabling the synchronization of the 1X and 2X symbol clocks with the recovered data signal. The symbol clock rates generated are best understood from the table below.

| Input Clock Symbol (Relative) | Control Input (SPS) | Rate Selector Divide Ratio | Rate Selector Output | 2X Symbol Clock (BPS) | 1X Clock (BPS) |
|---|---|---|---|---|---|
| 64X | 1600 | by 2 | 32X | 3200 | 1600 |
| 64X | 3200 | by 1 | 64X | 6400 | 3200 |

As shown in the table above, the 1X and 2X symbol clocks are generated 1600, 3200 and 6400 bits per second and are synchronized with the recovered data signal.

Figure 12:
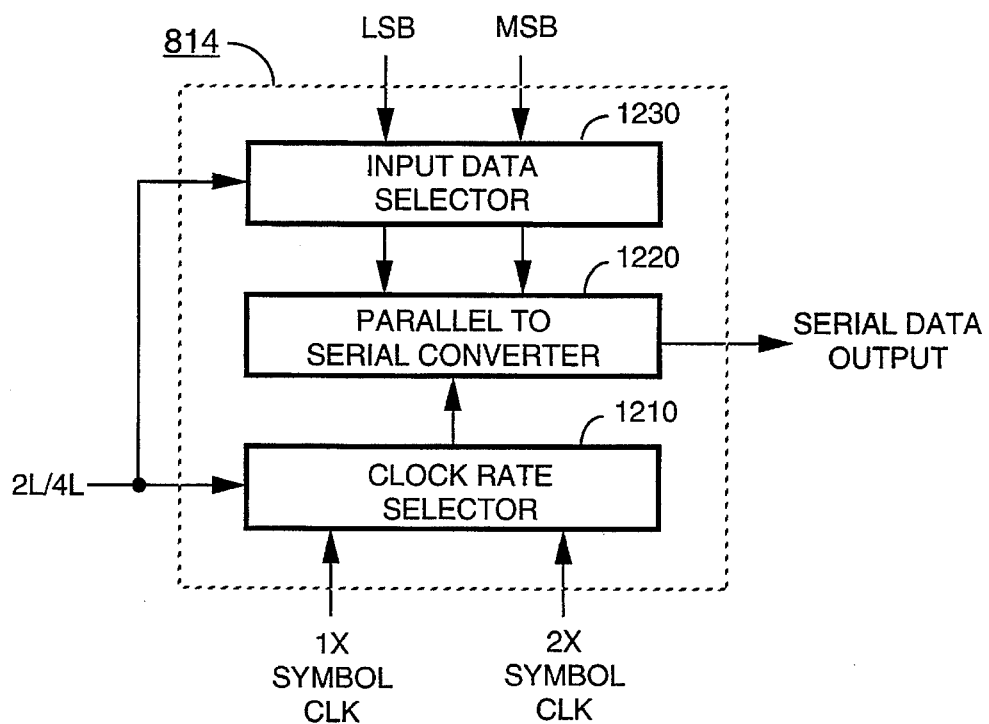
FIG. 12 is an electrical block diagram of a 4-level to binary converter utilized in the data communication receiver of FIG. 8.

The 4-level binary converter 814 is best understood by referring to FIG. 12. The 1X symbol clock is coupled to a first clock input of a clock rate selector 1210. A 2X symbol clock also couples to a second clock input of the clock rate selector 1210. The symbol output signals (MSB, LSB) are coupled to inputs of an input data selector 1230. A selector signal (2L/4L) is coupled to a selector input of the clock rate selector 1210 and the selector input of the input data selector 1230, and provides control of the conversion of the symbol output signals as either 2-level FSK data, or 4-level FSK data. When the 2-level FSK data conversion (2L) is selected, only the MSB output is selected which is coupled to the input of a parallel to serial converter 1220. The 1X clock input is selected by clock rate selector 1210 which results in a single bit binary data stream to be generated at the output of the parallel to serial converter 1220. When the 4-level FSK data conversion (4L) is selected, both the LSB and MSB outputs are selected which are coupled to the inputs of the parallel to serial converter 1220. The 2X clock input is selected by clock rate selector 1210 which results in a serial two bit binary data stream to be generated at 2X the symbol rate, which is provided at the output of the parallel to serial converter 1220.

Returning to FIG. 8, the serial binary data stream generated by the 4-level to binary converter 814 is coupled to inputs of a synchronization word correlator 818 and a demultiplexer 820. The synchronization word correlator is best understood with reference to FIG. 13. Predetermined "A" word synchronization patterns are recovered by the controller 816 from a code memory 822 and are coupled to an "A" word correlator 1310. When the synchronization pattern received matches one of the predetermined "A" word synchronization patterns within an acceptable margin of error, an "A" or "A-bar" output is generated and is coupled to controller 816. The particular "A" or "A-bar" word synchronization pattern correlated provides frame synchronization to the start of the frame ID word, and also defines the data bit rate of the message to follow, as was previously described.

The serial binary data stream is also coupled to an input of the frame word decoder 1320 which decodes the frame word and provides an indication of the frame number currently being received by the controller 816. During sync acquisition, such as following initial receiver turn-on, power is supplied to the receiver portion by battery saver circuit 848, shown in FIG. 8, which enabled the reception of the "A" synchronization word, as described above, and which continues to be supplied to enable processing of the remainder of the synchronization code. The controller 816 compares the frame number currently being received with a list of assigned frame numbers stored in code memory 822. Should the currently received frame number differ from an assigned frame numbers, the controller 816 generates a battery saving signal which is coupled to an input of saver circuit 848, suspending the supply of power to the receiver portion. The supply of power will be suspended until the next frame assigned to the receiver, at which time a battery saver signal is generated by the controller 816 which is coupled to the battery saving circuit 848 to enable the supply of power to the receiver portion to enable reception of the assigned frame.

Figure 13:
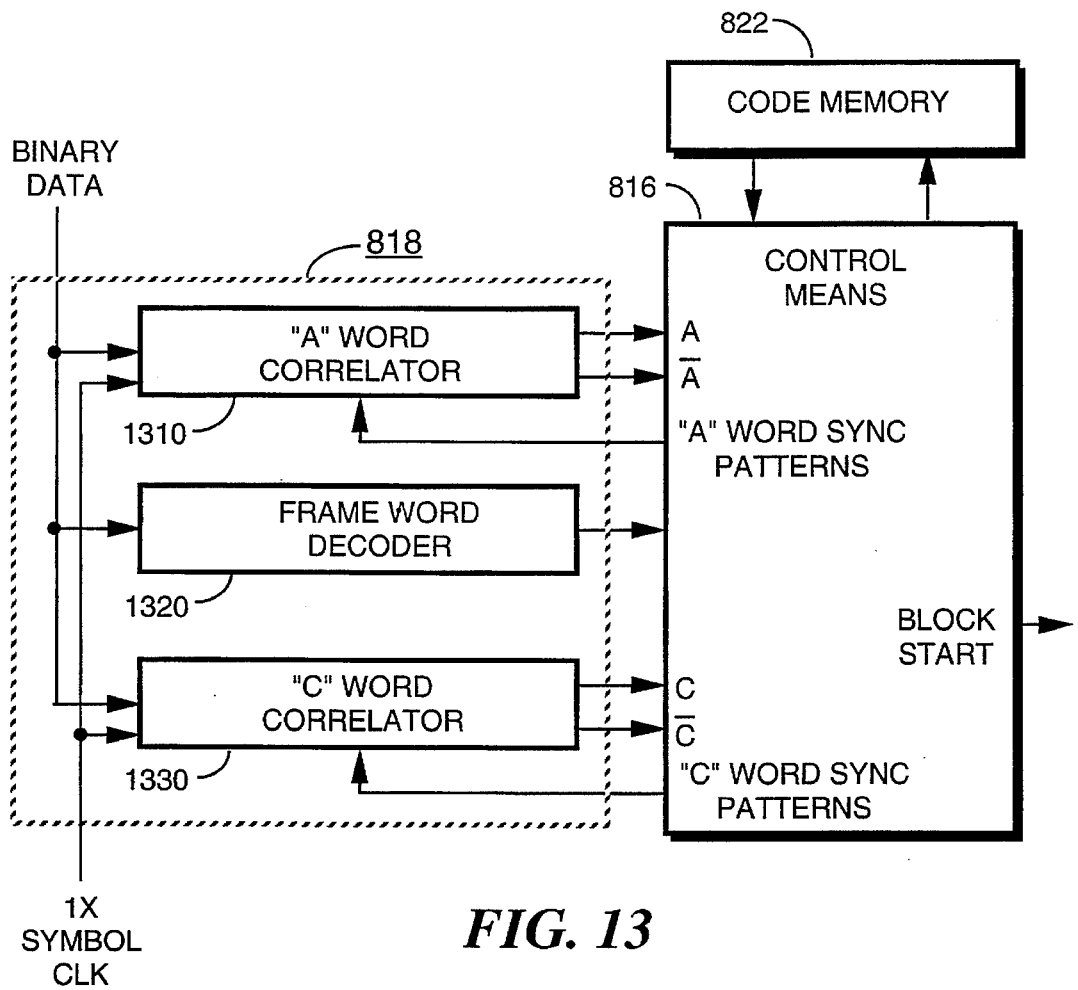
FIG. 13 is an electrical block diagram of a synchronization correlator utilized in the data communication receiver of FIG. 8.

Returning to the operation of the synchronization correlator shown in FIG. 13, a predetermined "C" word synchronization pattern is recovered by the controller 816 from a code memory 822 and is coupled to a "C" word correlator 1330. When the synchronization pattern received matches the predetermined "C" word synchronization pattern with an acceptable margin of error, a "C" or "C-bar" output is generated which is coupled to controller 816. The particular "C" or "C-bar" synchronization word correlated provides "fine" frame synchronization to the start of the data portion of the frame.

Figure 14:
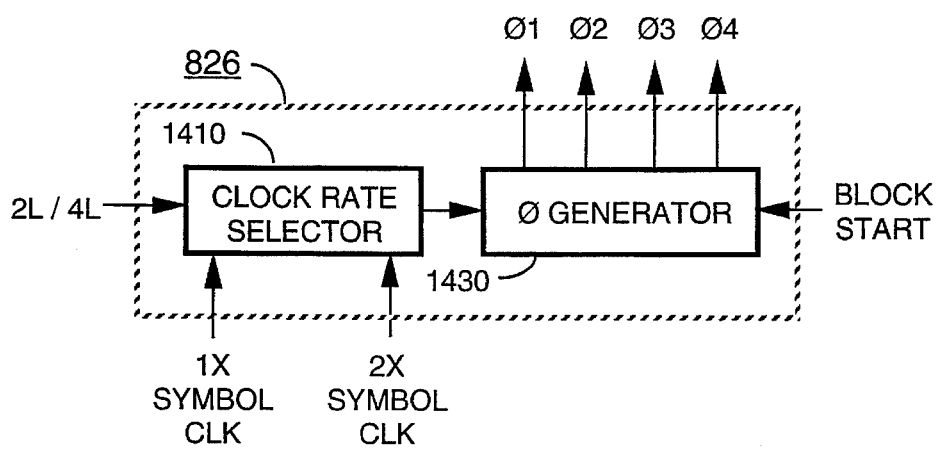
FIG. 14 is an electrical block diagram of a phase timing generator utilized in the data communication receiver of FIG. 8.

Returning to FIG. 8, the start of the actual data portion is established by the controller 816 generating a block start signal (Blk Start) which is coupled to inputs of a word de-interleaver 824 and a data recovery timing circuit 826. The data recovery timing circuit 826 is best understood by referring to FIG. 14. A control signal (2L / 4L) is coupled to an input of clock rate selector 1410 which selects either 1X or 2X symbol clock inputs. The selected symbol clock is coupled to the input of a phase generator 1430 which is preferably a clocked ring counter which is clocked to generate four phase output signals (φ1–φ4). A block start signal is also coupled to an input of the phase generator 1430, and is used to hold the ring counter in a predetermined phase until the actual decoding of the message information is to begin. When the block start signal releases the phase generator 1430, the phase generator 1430 begins generating clocked phase signals which are synchronized with the incoming message symbols.

Referring back to FIG. 8, the clocked phase signal outputs are coupled to inputs of a phase selector 828. During operation, the controller 816 recovers from the code memory 822, the transmission phase number to which the data communication receiver is assigned. The phase number is transferred to the phase select output (φ Select) of the controller 816 and is coupled to an input of phase selector 828. A phase clock, corresponding to the transmission phase assigned, is provided at the output of the phase selector 828 and is coupled to clock inputs of the demultiplexer 820, block de-interleaver 824, and address and data decoders 830 and 832, respectively. The demultiplexer 820 is used to select the binary bits associated with the assigned transmission phase which are then coupled to the input of block de-interleaver 824, and clocked into the de-interleaver array on each corresponding phase clock. The de-interleaver array is an 8×32 bit array which de-interleaves eight interleaved address, control or message code words, corresponding to one transmission block. The de-interleaved address code words are coupled to the input of address correlator 830. The controller 816 recovers the address patterns assigned to the data communication receiver 106, and couples the patterns to a second input of the address correlator. When any of the de-interleaved address code words matches any of the address patterns assigned to the data communication receiver 106 within an acceptable margin of error, the message information associated with the address is then decoded by the data decoder 832 and stored in a message memory 850 in a manner well known to one skilled in the art of selective call receivers. Following the storage of the message information, a sensible alert signal is generated by the controller 816. The sensible alert signal is preferably an audible alert signal, although it will be appreciated that other sensible alert signals, such as tactile alert signals, and visual alert signals can be generated as well. The audible alert signal is coupled by the controller 816 to an alert driver 834 which is used to drive an audible alerting device, such as a speaker or a transducer 836. The user can override the alert signal generation through the use of user input controls 838 in a manner well known in the art.

Following the detection of an address associated with the data communication receiver, the message information is coupled to the input of data decoder 832 which decodes the encoded message information into preferably a BCD or ASCII format suitable for storage and subsequent display. The stored message information can be recalled by the user using the user input controls 838 whereupon the controller 816 recovers the message information from memory, and provides the message information to a display driver 840 for presentation on a display 842, such as an LCD display.

Figure 15:
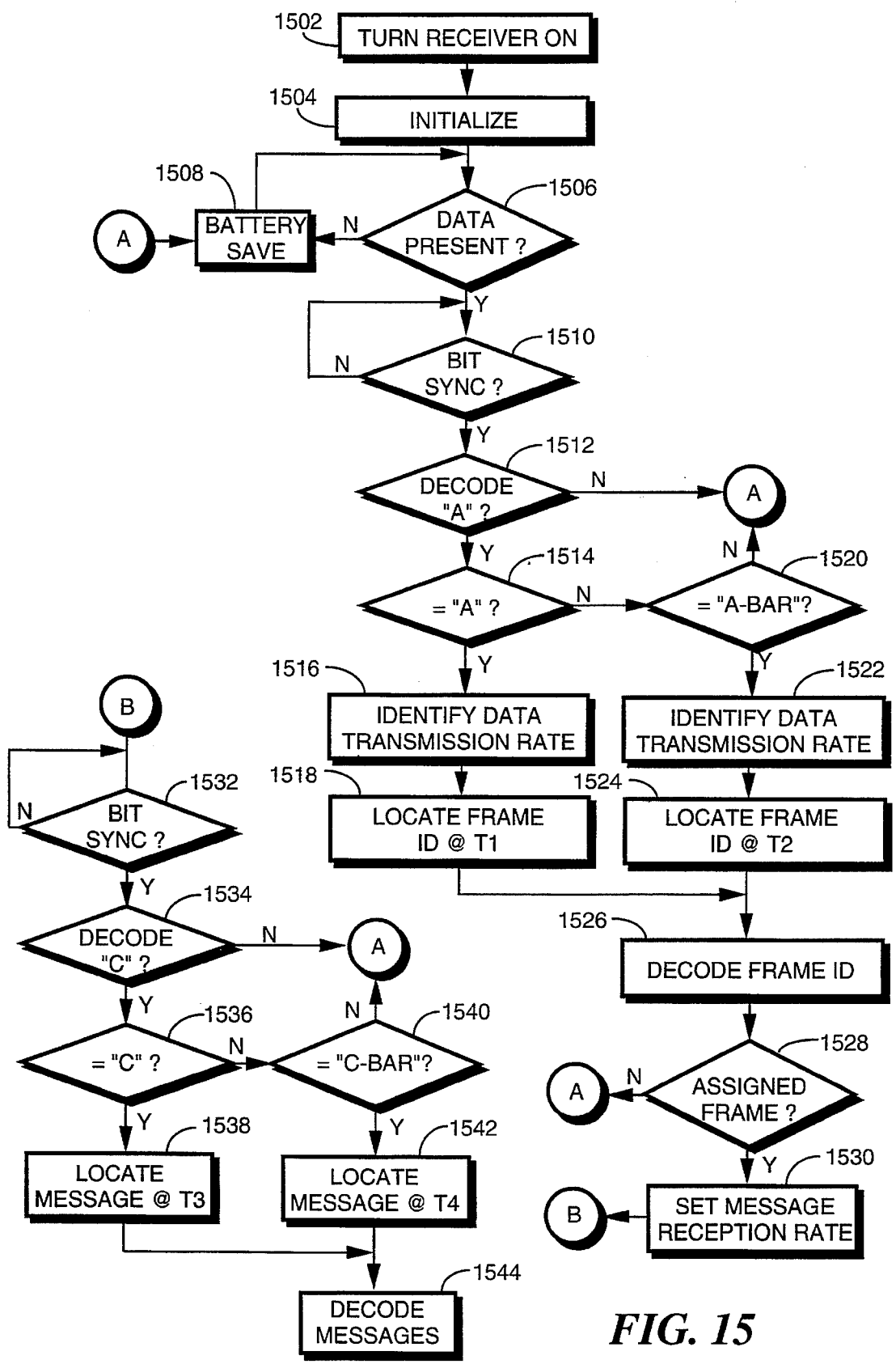
FIG. 15 is a flow chart illustrating the synchronization correlation sequence in accordance with the preferred embodiment of the present invention.

FIG. 15 is a flow chart describing the operation of the data communication receiver in accordance with the preferred embodiment of the present invention. At step 1502, when the data communication receiver is turned on, the controller operation is initialized, at step 1504. Power is periodically applied to the receiver portion to enable receiving information present on the assigned RF channel. When data is not detected on the channel in a predetermined time period, battery saver operation is resumed, at step 1508. When data is detected on the channel, at step 1506, the synchronization word correlator begins searching for bit synchronization at step 1510. When bit synchronization is obtained, at step 1510, the "A" word correlation begins at step 1512. When the non-complemented "A" word is detected, at step 1514, the message transmission rate is identified as described above, at step 1516, and because frame synchronization is obtained, the time (T1) to the start of the frame identification code word is identified, at step 1518. When the non-complemented "A" word is not detected, at step 1514, indicating the non-complemented "A" word may have been corrupted by a burst error during transmission, a determination is made whether the complemented "A bar" is detected, at step 1520. When the "A bar" word is not detected at step 1512, indicating that the "A-bar" word may also have been corrupted by a burst error during transmission, battery saver operation is again resumed, at step 1508. When the "A-bar" word is detected, at step 1520, the message transmission rate is identified as described above, at step 1522, and because frame synchronization is obtained, the time (T2) to the start of the frame identification code word is identified, at step 1524. At the appropriate time, decoding of the frame identification word occurs, at step 1526. When the frame ID detected is not one assigned to the data communication receiver, at step 1528, battery saving is resumed, at step 1508, and remains so until the next assigned frame is to be received. When the decoded frame ID corresponds to an assigned frame ID, at step 1528, the message reception rate is set, at step 1530. An attempt to bit synchronize at the message transmission rate is next made at step 1532. When bit synchronization is obtained, at step 1533, the "C" word correlation begins at step 1534. When the non-complemented "C" word is detected, at step 1536, frame synchronization is obtained, and the time (T3) to the start of the message information is identified, at step 1538.

When the non-complemented "C" word is not detected, at step 1536, indicating the non-complemented "C" word may have been corrupted by a burst error during transmission, a determination is made whether the complement "C bar" is detected, at step 1540. When the "C bar" word is not detected at step 1540, indicating that the "C-bar" word may also have been corrupted by a burst error during transmission, battery saver operation is again resumed, at step 1508. When the "C-bar" word is detected, at step 1540, frame synchronization is obtained, and the time (T4) to the start of the message information is identified, at step 1542. At the appropriate time, message decoding can begin at step 1544.

In summary, by providing multiple synchronization code words which are spaced in time, the reliability of synchronizing with synchronization information which is subject to burst error corruption is greatly enhanced. The use of a predetermined synchronization code word as the first synchronization code word, and a second predetermined synchronization code word which is the complement of the first predetermined synchronization code word, allows accurate frame synchronization on either the first or the second predetermined synchronization code word. By encoding the synchronization code words, additional information, such as the transmission data rate can be provided, thereby enabling the transmission of message information at several data bit rates. By using a second coded synchronization word pair, "fine" frame synchronization at the actual message transmission rate can be achieved, and again due to spacing in time of the synchronization code words, the reliability of synchronizing at a different data bit rate with synchronization information which is subject to burst error corruption is greatly enhanced, thereby improving the reliability of the data communication receiver to receive and present messages to the receiver user.

Figure 16:
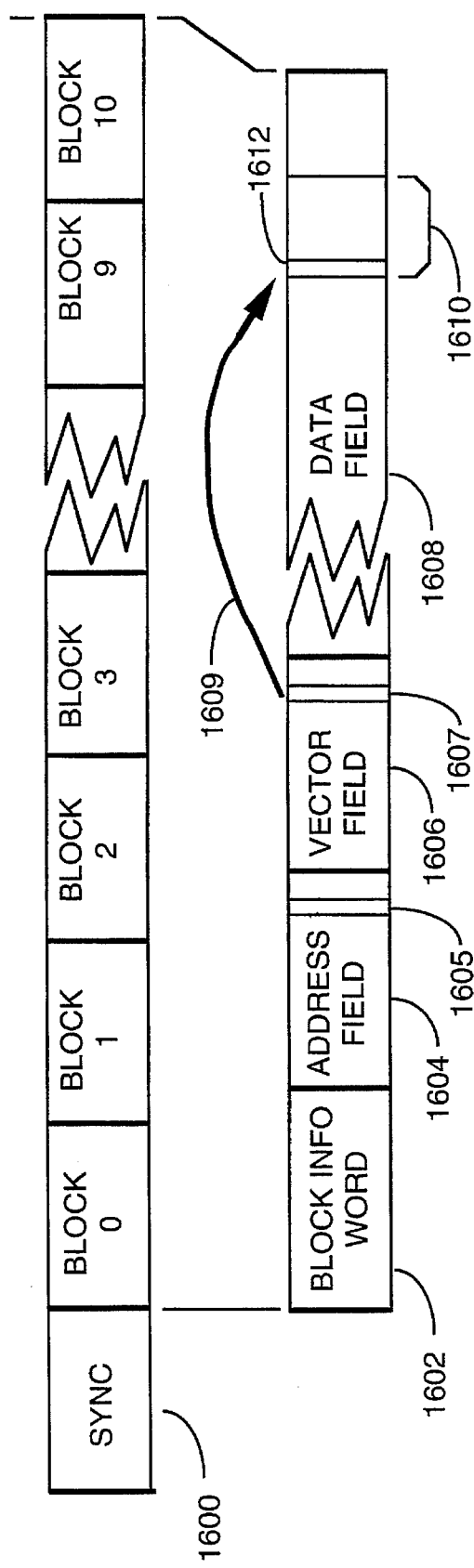
FIG. 16 is a timing diagram illustrating the organization of the transmission frame utilized in accordance with the preferred embodiment of the present invention.

FIG. 16 is a timing diagram illustrating the organization of the transmission frame utilized in accordance with the preferred embodiment of the present invention. As previously described for FIG. 4 and shown again in FIG. 16, the transmission frame comprises a synchronization code word 1600 followed by eleven data blocks labeled Block 0 to Block 10. Address, control and message code words are distributed within the eleven data blocks in a predetermined order. The first code word, located in Block 0, is always a block information code word 1602 and includes such information as the beginning locations of an address field 1604 and a vector field 1606, leaving eighty-seven code words available in the frame for the transmission of address, vector and data code words.

By knowing the beginning location of the address field 1604 and the vector field 1606, the controller 816 is able to calculate how many address code words must be decoded per frame in order to determine when a message is present within the frame. Consequently, the address field 1604 includes one or more address code words corresponding to messages located within a data field 1608. Address code words specifying, for example, numeric and alphanumeric messages have associated message information located within the data field 1608. Tone only messages can communicate all necessary information in the address code word, or optionally with a control code word in the vector field 1606, and consequently would not have associated message information located within the data field 1608.

For those address code words 1605 which do have corresponding messages 1610, the vector field 1606 includes control words 1607, or vectors, which include information to identify the starting location 1612 of messages 1610 located within the data field 1608. Specifically, the vector code word 1607 identifies the location of the first data code word 1612 and also the number of data code words in the data portion 1610 of the message for the current frame. Further, there is a one to one correspondence between the relative location of the address code words 1605 located within the address field 1604 and the relative location of the associated vectors (vector code words) 1607 located within the vector field 1606. In this way, the relative location of an address code word 1605 in the address field 1604 points to the location of an associated vector 1607 in the vector field 1606 which includes information that then points via 1609 to the starting location 1612 of a message 1610 in the data field 1608 of the current frame. This indirect pointing scheme provides significant flexibility in arranging the message information within transmission frames for the communication system 100 because the message information, including the relative starting position of the message information in a transmission frame, can be dynamically allocated to one or more transmission frames as the frames are being processed for transmission. Hence, the paging terminal 102 can organize the message information into the transmission frames as the paging requests are being processed with significant flexibility in selecting the relative position of the message information within the transmission frames.

Figure 17:
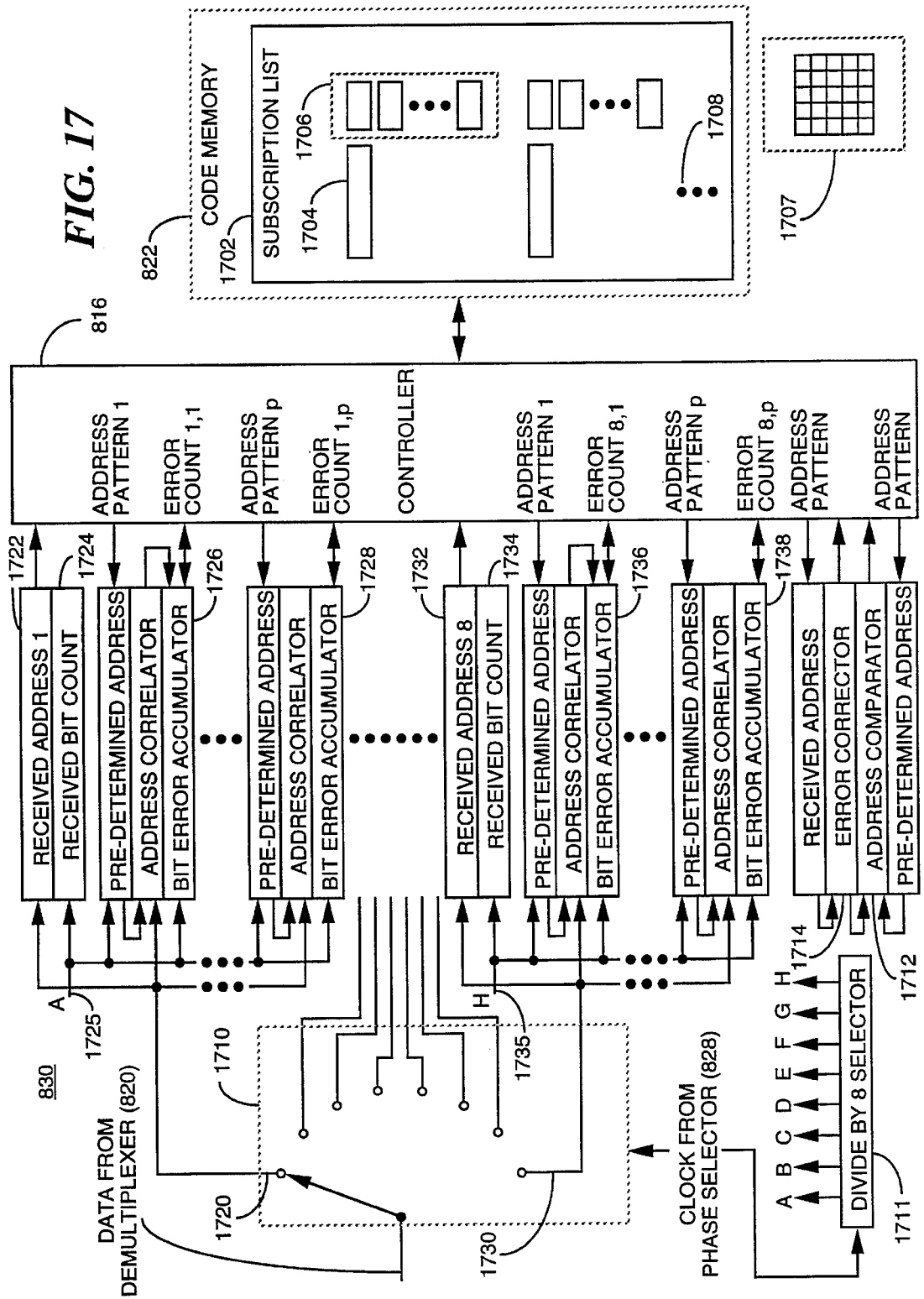
FIG. 17 is a more detailed electrical block diagram of the address correlator of FIG. 8, according to the preferred embodiment of the present invention.

FIG. 17 is a more detailed electrical block diagram of the address correlator 830 (FIG. 8) configured for partial interleaved address correlation, according to the preferred embodiment of the present invention. Here, the recovered address information is selected by the demultiplexer 820 shown in FIG. 8, such as by the data transmission rate and phase assigned to the receiver 106, and is applied to an input of the address correlator 830. Note from FIG. 8 that the recovered address information is serially coupled to the input of the address correlator 830 via the block de-interleaver 824. That is, the block de-interleaver 824 and the address correlator 830 receive the recovered address information as selected by the demultiplexer 820.

The phase clock which is synchronized to the recovered data and which is generated by the phase timing generator 826 and phase selector 828, as shown in FIG. 8, is coupled to the clock input of the address correlator 830 and therein coupled to the clock input of an address bit demultiplexer 1710 as shown in FIG. 17 to allow the recovered data to be clocked into the address bit demultiplexer 1710. The address bit demultiplexer 1710 sequentially selects an input 1720, 1730 of one of eight address correlators 1722,1732 for each bit of recovered data from the demultiplexer 820 thereby performing the address de-interleaving process. The first address correlator 1722 and the eighth address correlator 1732 are specifically shown in FIG. 17, while the other six similar address correlators are implied by the dotted lines between address correlators one 1722 and eight 1732.

The phase clock from the phase selector 828 is also coupled to the clock input of a divide by eight selector 1711 which provides eight select outputs A through H. Each of the eight select outputs A through H is enabled once every eight clock pulses of the phase clock. Each select output couples a select pulse signal to a select input 1725,1735 of each of the eight address correlators 1722,1732. The select pulse signals are synchronized with the address bit demultiplexer 1710 to provide a select pulse to each one of the eight address correlators 1722,1732 when its corresponding bit of recovered address information from the demultiplexer 820 is selectively coupled to the input 1720,1730 of the selected one of eight address correlators 1722,1732. In this way, eight interleaved address code words can be contemporaneously de-interleaved and processed (partially correlated bit by bit) by the eight address correlators 1722,1732. Of course, other numbers of address code words can be de-interleaved and processed using obvious variations of the structure and method described above. Further, in a non-interleaved communication protocol, there would be no need for the address bit demultiplexer 1710, and a single address correlator 1722 could serially receive a recovered data bit stream to decode the address code word using no de-interleaving.

Each of the eight address correlators 1722,1732 comprises a received address register which stores each incoming bit of a received address code word corresponding to the particular address correlator. Each address code word comprises an address pattern, e.g., twenty one bits of received address information out of thirty two bits in a received address code word. Each bit is clocked into the received address register using the select pulse signals at the select input 1725,1735. Further, each of the eight address correlators 1722,1732 comprises a received bit count accumulator 1724,1734 which accumulates a total count for the number of bits of a received address code word stored in the corresponding received address register.

At least one predetermined address pattern, e.g., a twenty one bit predetermined address pattern, corresponding to an address to which the data communication receiver 106 is assigned is applied to a second input of the address correlators 1722,1732, and stored in at least one predetermined address register for each of the eight address correlators 1722,1732. Specifically, for each predetermined address pattern each of the eight address correlators 1722,1732 comprises a predetermined address register, an address correlator/comparator, and a bit error accumulator 1726, 1728,1736,1738. For the first address correlator 1722 the first 1726 and last 1728 groupings of predetermined address register, address correlator/comparator, and bit error accumulator are shown corresponding to predetermined address pattern one and predetermined address pattern P, where the intervening groupings are implied by the dotted line. In similar fashion, address correlator eight 1732 is shown with the dotted line between the first 1736 and last 1738 groupings indicating other implied groupings. Again here the groupings correspond to the predetermined address patterns one to P. Clearly, the communication receiver 106 is preconfigured to selectively respond to the predetermined address patterns one to P.

In each grouping, the address correlator/comparator compares each incoming bit of a received address pattern with a corresponding bit of a predetermined address pattern. If the bits do not match then the address correlator/comparator applies a bit error signal to the bit error accumulator 1726, 1736. The bit error accumulator 1726,1736 is clocked according to the select pulse signals at the select input 1725,1735 to accumulate a total count of the number of mismatched bits between a received address pattern and a predetermined address pattern. In this way, each of the eight address correlators 1722,1732 receives an address pattern as part of the recovered data from the demultiplexer 820 and correlates the received address pattern with the at least one predetermined address pattern.

The correlation provides at least one bit error count corresponding to the at least one predetermined address pattern, respectively. For each predetermined address pattern, if the bit error count exceeds a predetermined threshold, such as more than two bit errors, then the predetermined address pattern does not match the received address pattern to the predetermined number of bits as indicated by exceeding the predetermined threshold count.

Therefore, in the partial correlation process discussed above, the address correlators 1722,1732 can determine before receiving all the bits of an address code word whether any predetermined address pattern will not match the address pattern being received. If all predetermined address patterns do not match the address pattern being received by each of the eight address correlators 1722,1732 then the communication receiver 106 can begin to conserve power, such as until the next block of eight address code words are to be decoded from the address field 1604, or otherwise as will be more fully discussed below.

In summary, address correlation continues on the received address patterns, e.g., the twenty one bits of received address information, until either an address is detected, meaning at least one address received was received with less than the predetermined number of bit errors, or until all addresses are found to have more than the predetermined number of bit errors, at which time battery saving is initiated. The battery saving operation described above allows battery saving earlier than would be possible when complete block de-interleaving is used prior to address correlation.

When the address correlators 1722,1732 can not rule out all of the predetermined address patterns as not matching the incoming received address patterns, the address correlators 1722,1732 consequently continue receiving the incoming bits of the received address patterns, preferably until the eight address code words are totally received into the eight received address registers of the eight address correlators 1722,1732. After fully receiving the eight address code words, the predetermined address patterns which are still candidates for matching with the received address patterns corresponding to the received address code words are further processed to determine a match.

The controller 816 couples to an error corrector 1714 each received address code word which has at least one candidate predetermined address pattern (not exceeding the bit error threshold count) to correct, for example, up to two error bits that may be included in the received address code word. The error correction is performed in a manner well known to those skilled in the art. The error corrector 1714 indicates to the controller 816 whether the correction was successful.

If the correction was not successful, then the received address code word has too many received bit errors and will be removed from consideration as a viable received address code word. No further processing of an uncorrectable address code word is done.

If the error corrector 1714 successfully corrects the address code word, then the error corrector 1714 sends a signal thereof to the controller 816 accordingly. Then, an address comparator 1712 compares the address pattern of a corrected address code word from the error corrector 1714 with each candidate predetermined address pattern. Specifically, the controller 816 couples each candidate predetermined address pattern into a predetermined address register for the address comparator 1712, and then the address comparator 1712 performs the comparison with the address pattern of the corrected address code word from the error corrector 1714.

A match between the address pattern of a received address code word and a predetermined address pattern indicates that the communication receiver 106 is selected for reception of a message. A data message associated with the address code word having the matching address pattern is normally located in the data field 1608 of the current transmission frame as discussed earlier. The communication receiver 106 can store in memory 822 a marker indicating the address code word as a match and for subsequently receiving the corresponding message data from the data field 1608 of the current transmission frame.

In the preferred embodiment of the present invention, the code memory 822 is shown including a subscription list 1702. The subscription list 1702 is utilized by the address correlator 830 to identify at least one predetermined service address 1704 and at least one predetermined category address 1706 associated with each one of the at least one predetermined service address 1704. Preferably, each predetermined service address 1704 identifies a particular information service provider. Further, each predetermined category address 1706 identifies a subscription provided by the particular information service provider. Hence, the combination of the predetermined service address 1704 and the predetermined category address 1706 constitutes a subscription address for the particular information service provider.

This combination address is considered a multi-recipient address because the subscription address is typically broadcasted to all subscribing communication receivers. In this way, the communication system can deliver information services to the subscribers of an information service provider. The communication receiver 106 can then quickly and efficiently detect an address code word 1605 comprising the subscription identification, and consequently can decode the associated data portion 1610 of a transmitted message, which comprises the subscribed to information.

A user can subscribe to one or more information services as identified by the respective predetermined service addresses 1704. Also, for each information service the user can subscribe to one or more information subscriptions as identified by a corresponding category address 1706. The subscription list 1702 preferably is organized in tabular fashion, where the table comprises 1, 2, or more service addresses as indicated by the doted line 1708. Each predetermined service address 1704 is associated with a grouping of one or more predetermined category addresses 1706 which are preferably organized in a block in memory 822. In one aspect of the preferred embodiment, the predetermined service address 1704 comprises 16 bits of information. Also, the predetermined category address 1706 comprises 5 bits of information. Therefore, a predetermined service address 1704 combined with one of the predetermined category addresses 1706 preferably comprises 21 bits of information constituting a predetermined subscription address. The predetermined subscription address uniquely identifies a subscription to an information service provided by an information service provider. When this predetermined subscription address matches a received subscription address, e.g., the address portion of an error corrected received address code word, the communication receiver 106 has detected an address code word 1605 comprising the subscription identification and consequently can decode the associated data portion 1610 of a transmitted message, which comprises the subscribed to information.

Figure 18:
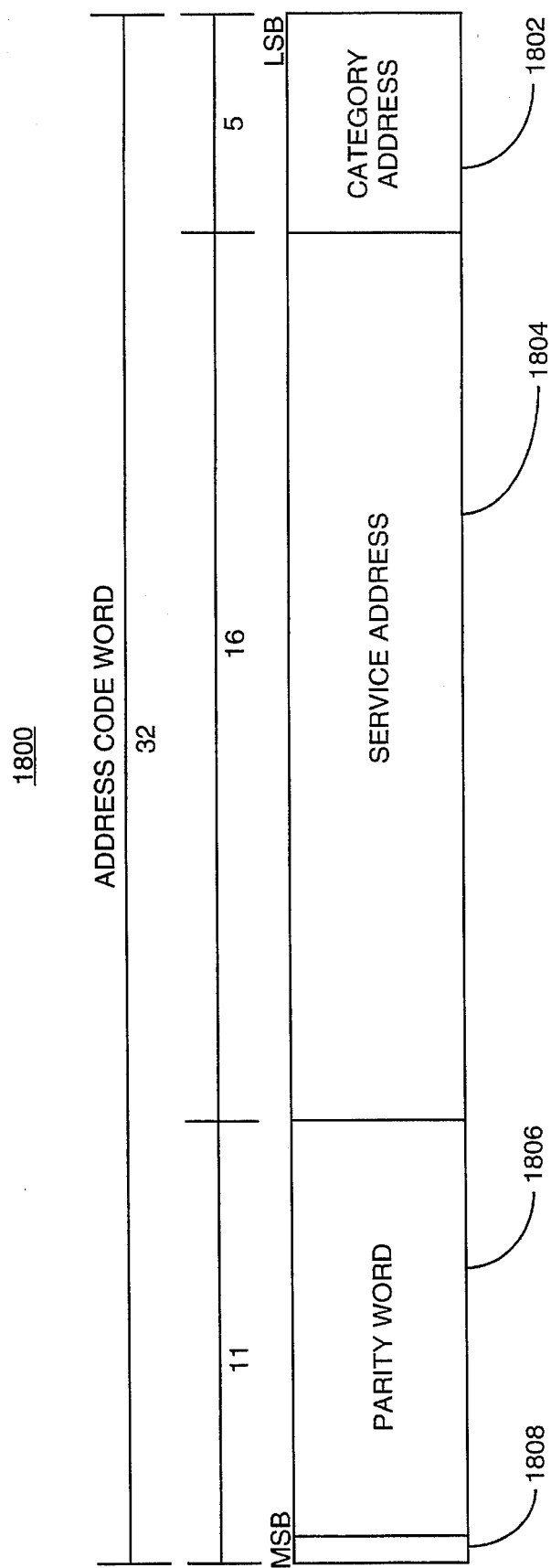
FIG. 18 is a timing diagram illustrating the transmission format of the signaling protocol utilized in accordance with the preferred embodiment of the present invention.

Referring to FIG. 18, a timing diagram illustrates the composition of an address code word 1800 in accordance with the preferred embodiment of the present invention. As can be seen, in this example, the address code word 1800 is a 32 bit data word. Further, it is preferably organized as a 32, 21BCH code word, as described below. From the least significant bit (LSB) to the most significant bit (MSB), the address code word 1800 includes, for example, a 5 bit category address 1802, a 16 bit service address 1804, a 10 bit parity word 1806, and a parity bit 1808. Although the category address and the service address are discussed as being 5 bits and 16 bits, respectively, it is understood that other number of bits may be used for each of the two fields. Further, one address field of a predefined length, e.g., a 21 bit field, can be used to represent a subscription address to perform the total address correlation therewith.

In this signaling protocol, a 10 bit parity word 1806 is selected such that every address code word 1800 differs by at least 5 bits from every other address code word 1800 in the addressing protocol. This parity word 1806 is useful for the error corrector 1714 for performing error correction of a received address code word 1800.

The parity bit 1808 can be defined as an even or an odd parity bit for the entire address code word 1800. For example, if the lower 31 bits of an address code word 1800 include an even number of ones then the parity bit 1808 may be set to zero. For an odd number of ones in the lower 31 bits of an address code word 1800, the parity bit 1808 may be set to 1. Hence, the parity bit 1808 provides a relatively quick way to detect 1 bit of error in a received address code word 1800.

In one exemplary approach of organizing addresses in a communication system, a block of addresses are reserved in a predetermined address space for all of the information service providers. The block of addresses for all the information service providers could be organized into sub-blocks of 32 subscription addresses for each information service provider. In this way, each service address 1804 can have associated with it up to 32 category addresses 1802.

Alternatively, as a second example, each information service provider can be assigned a block of addresses, such as 32 subscription addresses, where the blocks of addresses are distributed throughout the entire address space of the communication system with a maximum numerical distance (or as distant as may be desired in an addressing scheme) between address blocks assigned to individual information service providers. This distribution of address blocks tends to reduce the probability that the bit patterns of the addresses assigned to a first information service provider are "virtually" the same as the bit patterns of the addresses assigned to a second information service provider. As a result, an address correlation process in the communication receiver 106 that is subscribing to one or more information service providers can detect as early as possible that a correlation between a subscription address being received does not match any predetermined subscription addresses in memory 822. Consequently, the communication receiver 106 can begin conserving power as soon as no match is determined, preferably as early in the address correlation process as possible, and therefore will additionally extend battery life for the communication receiver 106.

Furthermore, the address code word 1800 is organized with the parity word 1806 to allow an error corrector 1714 (FIG. 17) to correct, for example, up to two error bits included in a received address code word in a manner well known to those skilled in the art. Hence, even with two bits of error in a received address code word, the received address code word can be restored to the correct value and then the subscription address from the corrected address code word can be utilized to determine whether the received and corrected subscription address matches with a predetermined subscription address for the communication receiver 106.

Referring again to FIG. 17, as discussed earlier, a serial bit stream of data is coupled from the demultiplexer 820 to an input of the address correlator 830. Further, the controller 816 retrieves predetermined address patterns from the code memory 822 and couples the patterns to a second input of the address correlators 1722,1732. These predetermined address patterns are the predetermined service addresses 1704 for correlating the service address 1804 portion of a received address code word 1800 thereto as discussed above.

Although in one aspect of the preferred system, the least significant 21 bits of the address code word 1605 (see FIG. 16) comprise a service address 1804 and a category address 1802, such as the 16 bits of service address 1804 and the 5 bits of category address 1802, the full 21 bit address field can alternatively be used as a complete identifier of a subscription address without requiring the two separate service address and category address sub-fields. However, by using the address sub-fields, a communication receiver 106 can process received addresses more quickly and efficiently, as will be more fully discussed below. Further, this partitioning of addresses into sub-fields also allows more efficient segmentation of the available address space for a communication system 100 to distribute smaller blocks of the available system addresses as a commercial resource between the member information service providers.

Following the detection of a match between the service address portion 1804 of a received address code word 1800 and one of the predetermined service addresses 1704 in the subscription list 1702, the address correlator 830 then determines if there is a match between the category address portion 1802 of the received address code word 1800 and one of the predetermined category addresses 1706 associated with the previously matching predetermined service address 1704. In one aspect of the preferred embodiment, the address correlator 830 performs a sequential comparison to detect a match by traversing a list of predetermined category addresses 1706 associated with the previously matching predetermined service address 1704.

Alternatively, in a second aspect of the preferred embodiment, a table 1707 (FIG. 17) in memory 822 replaces the list 1706 associated with each predetermined service address 1704. The table 1707 comprises a collection of predetermined category addresses available from a service provider, the service provider being identified by the predetermined service address 1704. The address correlator 830, in this approach, utilizes a tabular look-up mechanism for performing the matching function between the received category address 1802 and the predetermined category addresses in the table 1707. Specifically, the table 1707 can be indexed by the value contained in the received category address 1802. A marker located at the indexed table location will indicate whether the received category address 1802 is a match. For example, if the marker is set to a predetermined value it indicates that the received category address 1802 is subscribed to (a match) and that the data portion of the message should be received and stored into memory 850. If the marker, on the other hand, is not set to the predetermined value then the category address 1802 is not subscribed to (not a match).

If a match exists between the received category address 1802 and a predetermined category address 1706,1707, utilizing either the sequential comparison approach or the tabular look-up approach, then the message data portion associated with the address code word 1800 is subsequently decoded by the data decoder 832. The data decoder 832 can then store the decoded message data portion in a message memory 850. The data portion of the message stored in memory 850 provides the subscribed to information to the user of the communication receiver 106. The user can subsequently recall the stored message information by using the user input controls 838 whereupon the controller 816 retrieves the message information from memory and provides the message information to the display driver 846 for presentation on the display 842. In this way, the user has access to the subscribed to information.

If the address correlator 830 determines that there is no match between the received service address 1804 of the received address code word 1800 and any one of the predetermined subscription addresses 1704, or that there is no match between the received category address 1802 and any predetermined address 1706,1707, using either approach discussed above, then the controller 816 generates a battery saving signal. This battery saving signal is coupled to an input of the battery saver circuit 848 to suspend the supply of power to the receiver circuits of the communication receiver 106. The supply of power will be suspended at least during the associated data portion of the message. For an information service provider, the data portion of the message may be fairly long. By suspending the supply of power from non-essential electronic circuits, such as the receiver portion of the communication receiver 106 when not in use, such as during the long data portion of the message that is not destined for the particular communication receiver 106, the battery life of the communication receiver 106 can be significantly improved.

Figure 21:
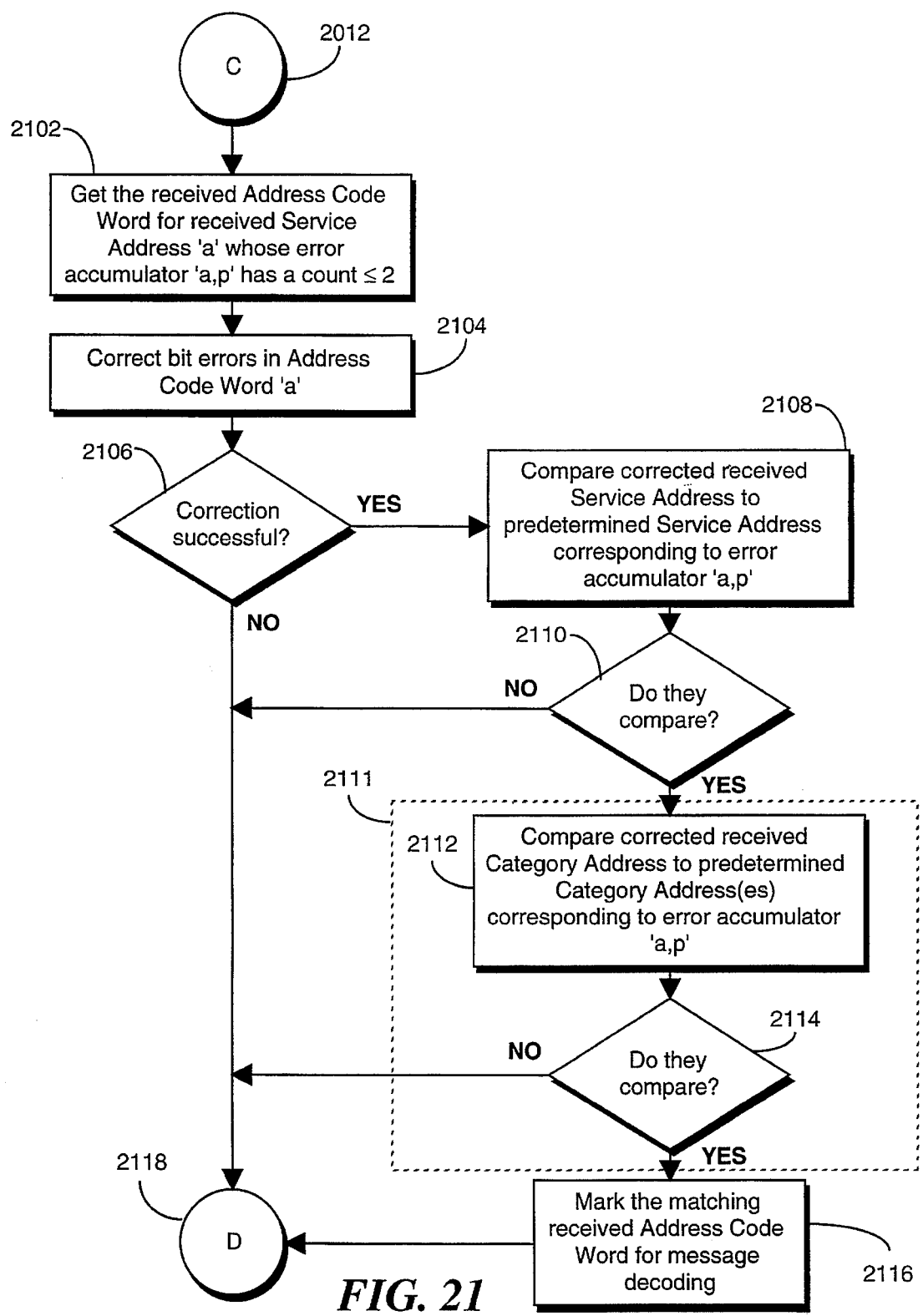
Figure 22:
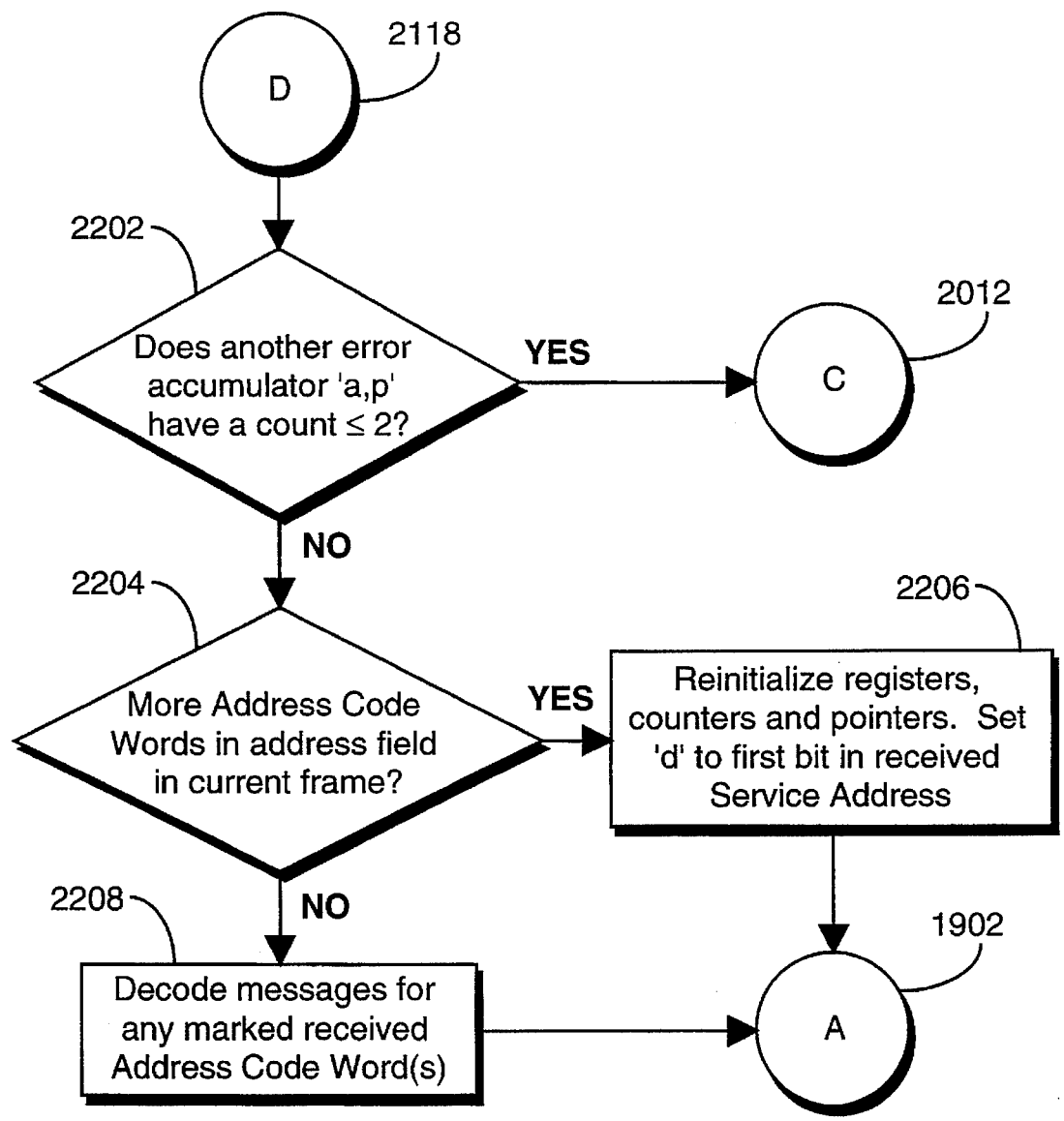
Figure 23:
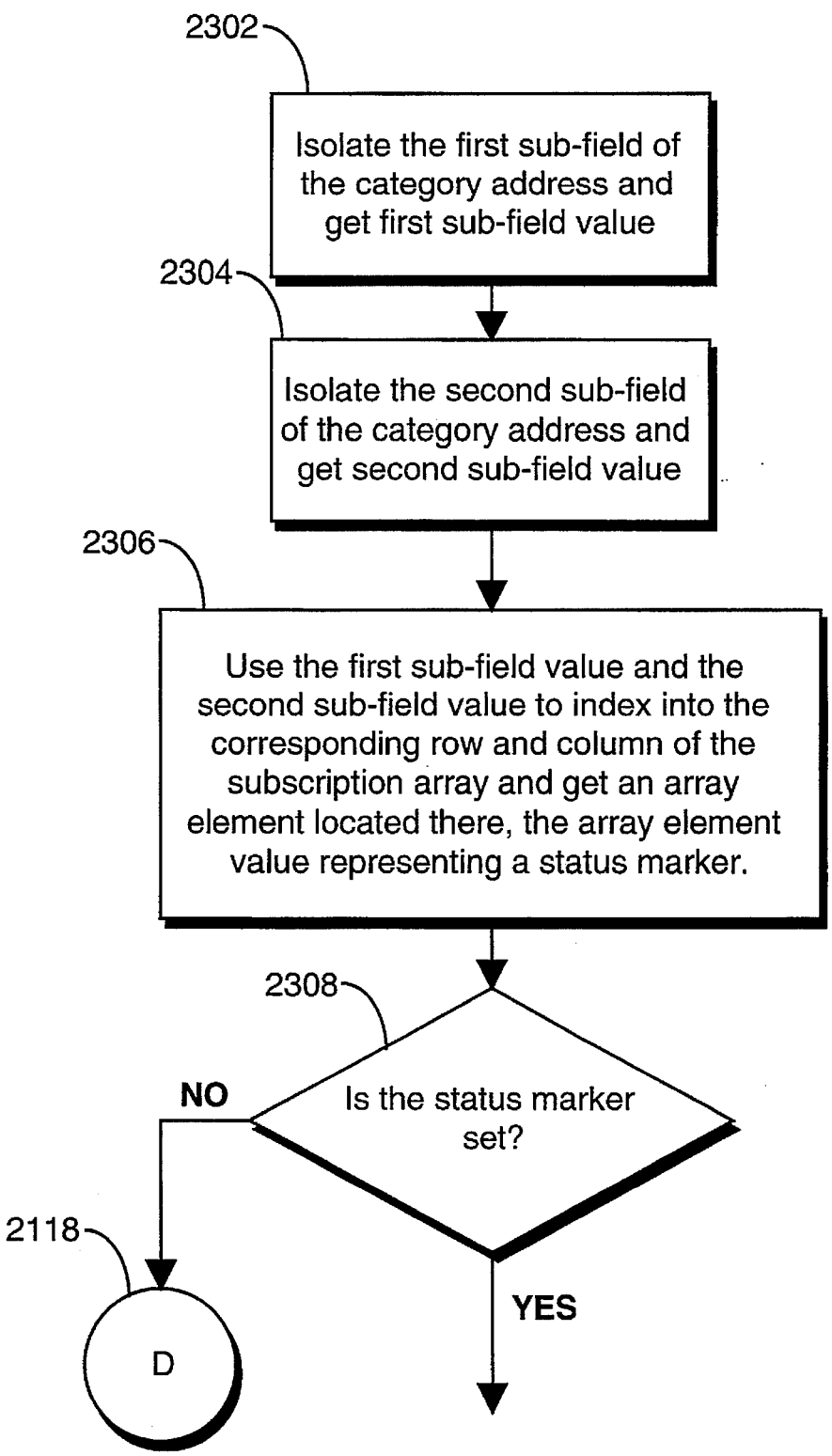

FIGS. 19, 20, 21, 22, and 23 are flow diagrams illustrating operational sequences for the address correlator 830 and controller 816 according to the preferred embodiment of the present invention. FIGS. 19, 20, 21, and 22 illustrate a preferred address decoding sequence, and FIG. 23 illustrates a tabular look-up alternative for determining a match between a received category address 1802 and the predetermined category addresses stored in a table 1707 in memory 822. Additionally, FIGS. 24, 25, 26, and 27 will be used to illustrate some of the advantages of the tabular look-up approach.

Figure 19:
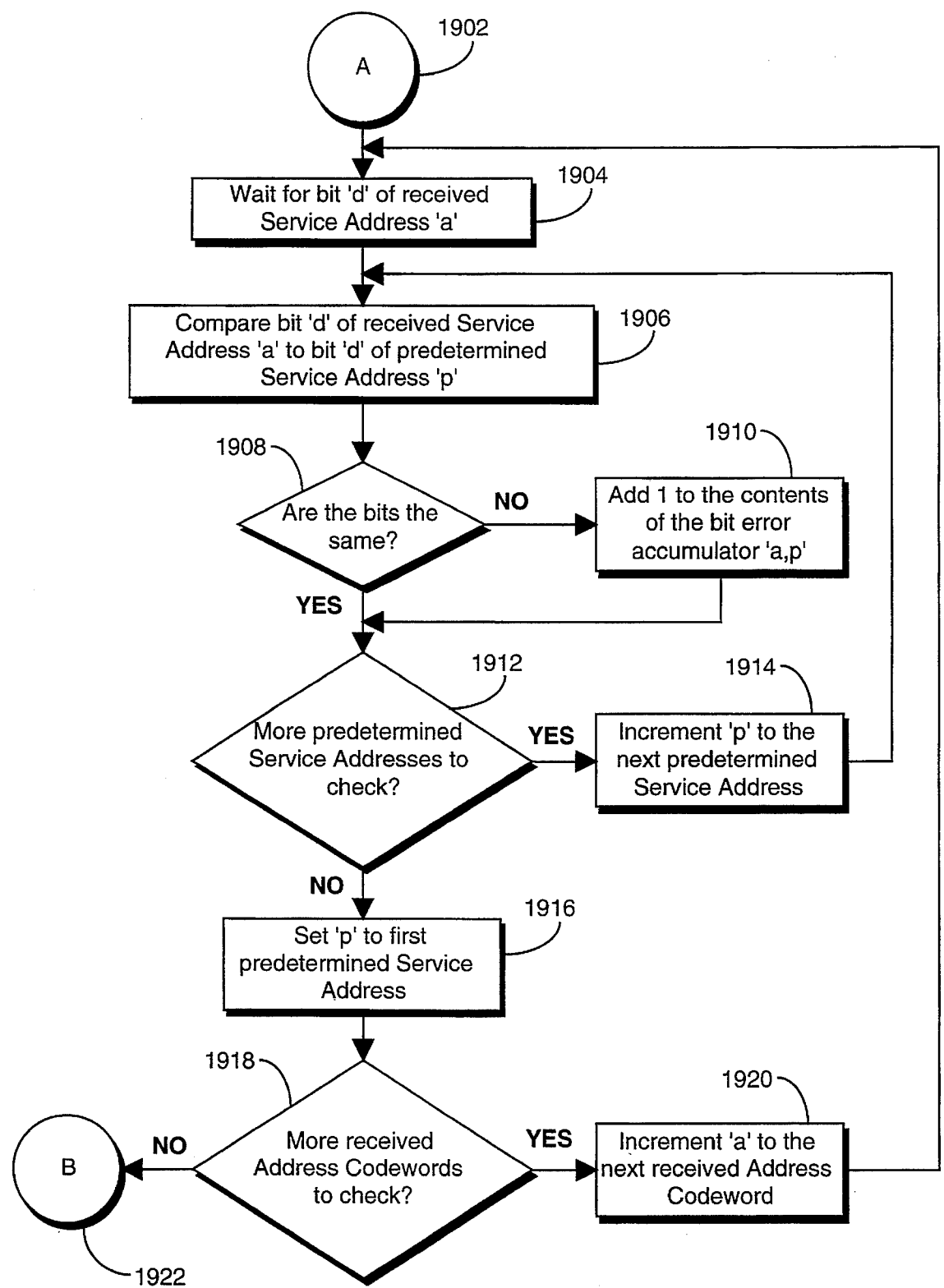
FIGS. 19, 20, 21, 22, and 23 are flow diagrams illustrating operational sequences for the address correlator and controller of FIG. 17 in accordance with the preferred embodiment of the present invention.

Referring to FIG. 19, the address correlator 830 performs partial correlation of incoming bits of eight interleaved address code words, similar to as discussed before. Generally, after initializing all parameters and entering the processing routine, at step 1902, the outer loop, at steps 1904, 1906, 1908, 1912, 1916, 1918, and 1920, processes a received bit of a received service address 1804 for each of the eight address code words 1800 being de-interleaved, as discussed before with reference to FIG. 17. Notice from FIG. 18 that the service address 1804 in this example starts at bit six of a received address code word 1800. Hence, the first five bits of the address code word 1800 are stored in each of the eight received address registers of the eight address correlators 1722,1732 without being processed at this time.

For each bit of a received service address 1804, the inner loop, at steps 1906, 1908, 1912, and 1914, processes a corresponding bit of each of the predetermined service addresses 1704 to determine whether the bits match, at step 1908. If the bits do not match, at step 1908, then the error accumulator corresponding to the particular predetermined service address is incremented, at step 1910. Therefore, the inner loop updates bit error accumulators for all predetermined service addresses for each of the eight address correlators 1722,1732, and the outer loop steps through the eight address correlators 1722,1732, to process a currently received bit for eight address code words 1800 being de-interleaved.

Figure 20:
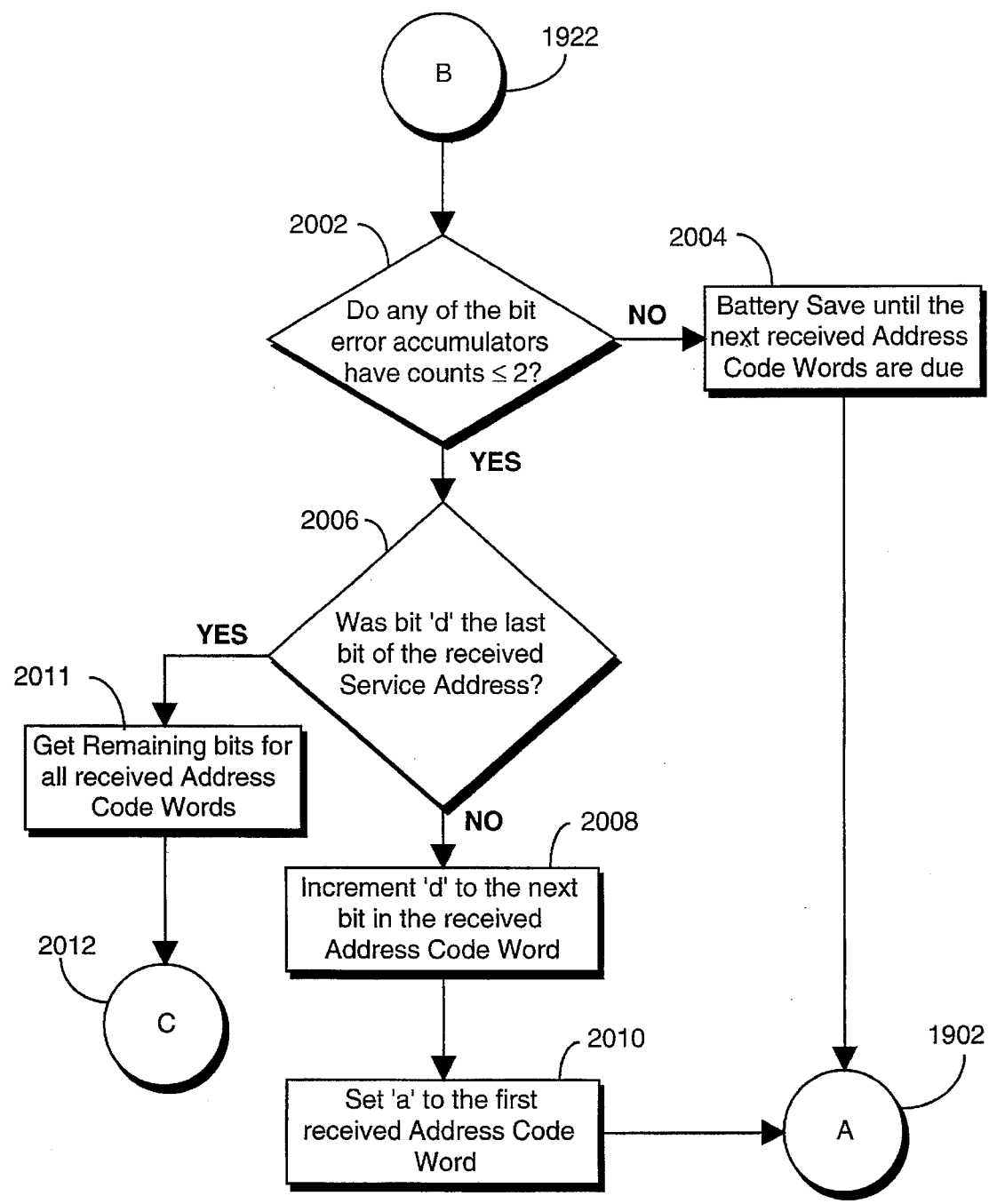

Moving on to FIG. 20, at step 1922, the address correlator 830 checks, at step 2002, if any of the bit error accumulators 1726, 1728, 1736, 1738, are still within the threshold count, e.g., less than or equal to two bits of accumulated bit errors, indicating that there are still candidate predetermined service addresses 1704, as discussed before with reference to FIG. 17. If there are no more candidate predetermined service addresses 1704, at step 2002, i.e., none of the address code words 1800 being de-interleaved are addressing the communication receiver 106 for reception of a message, then the controller 816 couples the battery saving signal to the input of the battery saver circuit 848, at step 2004, as discussed before. This conserves the life of the battery.

As shown in FIG. 20, a second outer loop, at steps 2002, 2006, 2008, 2010, and 1902, processes a next bit of each of eight service addresses 1804 of eight de-interleaving address code words 1800. That is, as discussed earlier for FIG. 19, the eight address correlators 1722,1732, will process the next bit received with the eight address code words 1800 being de-interleaved. This second outer loop is repeated for the total number of bits of the service address 1804 for the eight address code words 1800 being de-interleaved. In our exemplary system protocol, this last bit is the twenty first bit of the address code word 1800.

After the last bit of the service address 1804 is processed, at step 2006, the address correlator 803 continues receiving, at step 2011, the remaining bits of the eight address code words 1800 being de-interleaved and stored in the eight received address registers of the eight address correlators 1722,1732. In this example, bits 22 to 32 for the eight address code words 1800 are received by the address correlator 830, at step 2011. Processing then continues on FIG. 21, at step 2012.

As shown in FIGS. 21 and 22, a processing loop, at steps 2102, 2104, 2106, 2118, 2202, and 2012, processes those received address code words 1800 having a candidate predetermined service address 1704, as discussed before with reference to FIG. 17. Candidates are service addresses that are determined to be valid address code words by virtue of their position in the exemplary system protocol, e.g., in the address field 1604 (FIG. 16), and that differ by two or less bits with a predetermined service address. The address correlator 830 performs error correction on those received address code words 1800, at step 2104. After a successful correction, at step 2106, the address correlator 830 directly compares the corrected service address 1804 to the candidate predetermined service address 1704 at step 2108. This direct comparison confirms, after the error correction of the address code word 1800, that the previous result of the bit by bit error accumulation between the received service address 1804 and the candidate predetermined service address 1704 was correct. If the candidate predetermined service address matches the received service address 1804, at step 2110, then the address correlator 830 determines whether the received category address 1802 matches a predetermined category address, at step 2111.

In a first aspect of the preferred embodiment of the present invention, at step 2111, the address correlator 830 traverses a list of predetermined category addresses 1706, at steps 2112, 2114. Here, a processing loop repeats a comparison between the received category address 1802 and each predetermined category address 1706 in the list until a match is found, or until the total number of predetermined category addresses in the list 1706 are compared and no match found.

Figure 24:
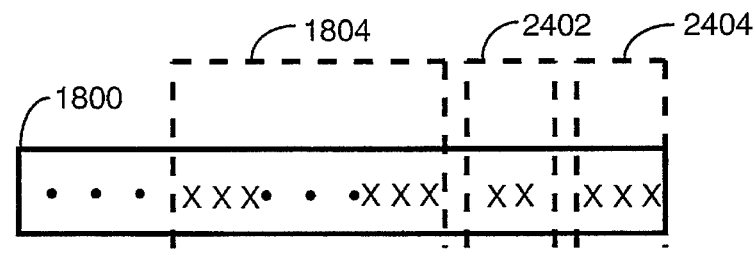
FIG. 24 is a timing diagram illustrating a first exemplary address code word signaling protocol.
Figure 25:
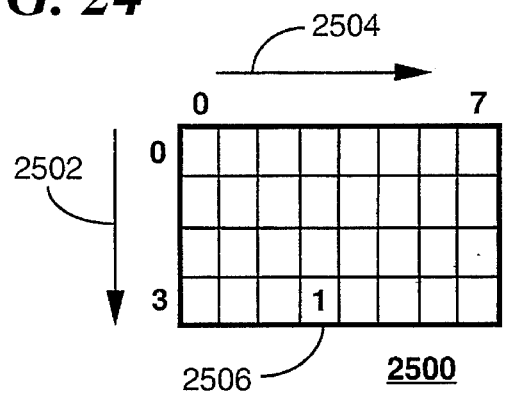
FIG. 25 is a block diagram of a first exemplary subscription array organization in memory, according to the preferred embodiment of the present invention.
Figure 26:
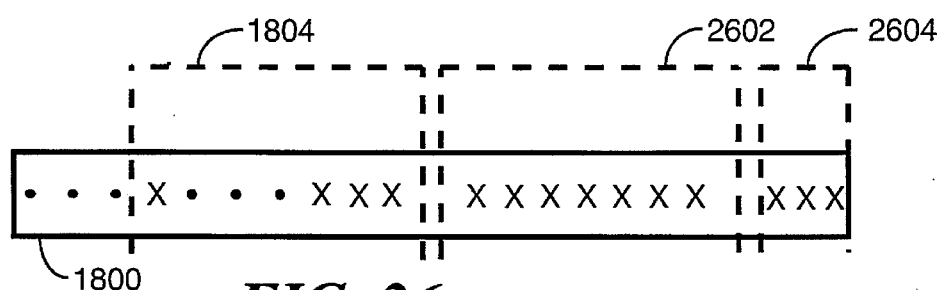
FIG. 26 is a timing diagram illustrating a second exemplary address code word signaling protocol.
Figure 27:
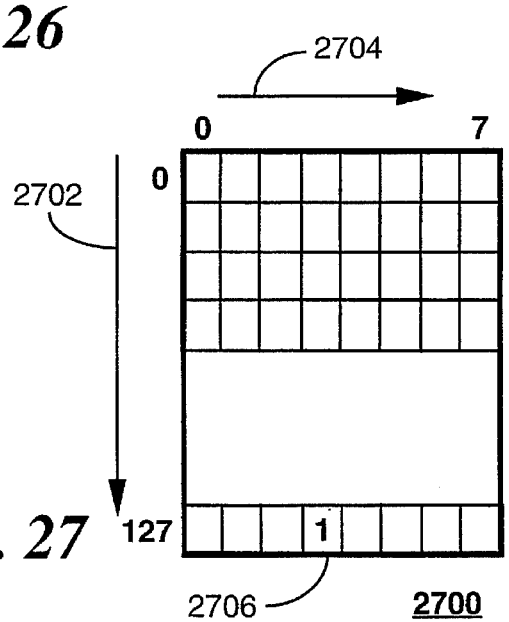
FIG. 27 is a block diagram showing a second exemplary subscription array organization in memory, according to the preferred embodiment of the present invention.

In a second aspect of the preferred embodiment of the present invention, step 2111 is replaced by the steps 2302, 2304, 2306, and 2308 as shown in FIG. 23. These alternative steps illustrate the tabular look-up approach for determining whether a received category address 1802 matches a predetermined category address 1707, as discussed above with reference to FIG. 17. Here, the predetermined category addresses are represented by a category address array 1707 having one or more dimensions, e.g., two dimensions (rows and columns) are shown in FIGS. 25 and 27. The received category address 1802, when performing look-ups using a multi-dimensional predetermined category address array 1707, is segmented into a plurality of sub-fields corresponding to the number of dimensions of the predetermined category address array 1707. For example, a two dimensional array 1707, such as shown in FIGS. 25 and 27 is indexed by two sub-fields 2402,2404,2602,2604 of the received category address 1802, as shown in FIGS. 24 and 26, respectively. This tabular look-up approach has the advantage that the address correlator 830 can process a very large number of predetermined category addresses by indexing into a multi-dimensional array 1707 using markers at indexed locations in the array 1707 to indicate whether the communication receiver 106 is subscribing to a particular information category, as will be more fully discussed below.

In either alternative approach discussed above, if a match is found then the address correlator 830 marks, at step 2116 (FIG. 21), the matching received address code word 1800 in memory 822 for subsequent processing of the data portion 1610 of the message corresponding to the address code word 1605 (see FIG. 16), as discussed before. As shown in FIG. 22, the address correlator 830, at step 2204, determines whether there are more address code words 1605 to process in the address field 1604 of the current transmission frame. The number and position of the expected address code words is conveyed in the exemplary system protocol. If there are more address code words 1605 to process, at step 2204, the address correlator 830 reinitializes parameters, at step 2206, and begins to conserve battery power until the next address code words 1605 are to be processed. If there are no more address code words to be processed, at step 2204, the address correlator 830 subsequently decodes the data portion 610 of the messages whose address code words 1605 were previously marked as having matched a predetermined address for the communication receiver 106.

By using a hierarchical organization of predetermined service addresses 1704 and associated predetermined category addresses 1706 the address correlator 830 can efficiently compare a received subscription address with a moderately large number of predetermined subscription addresses, such as thirty two. This allows an information service provider to offer a rich selection of information services to its customers, which is an advantage in today's competitive marketplace.

On the other hand, in an ever increasingly competitive market place for information service providers it is expected that information service providers may want to offer greater numbers of subscriptions to their subscribing members. For example, it may be desirable at a point in time for an information service provider to allow customers to have up to, say, 1,000 different subscriptions.

Unfortunately, as may be appreciated by those skilled in the art, the technical constraints on conventional selective call receivers can restrict the number of individual addresses that a selective call receiver responds to. Normally, the computer processing power available in a portable device such as a communication receiver 106 is limited by factors such as overall size, power consumption, heat dissipation, cost, weight, cost of product, etc.

As discussed above, and as illustrated in FIGS. 24 and 25, the preferred embodiment of the present invention contemplates organizing the predetermined category addresses in an array 2500 having dimensions, such as two dimensions (rows and columns) in this example, and the received category address 1802, as discussed above, is partitioned into two sub-fields 2402, 2404. The first sub-field 2402 corresponds to a first dimension 2502 of a subscription array 2500 and the second sub-field 2404 corresponds to a second dimension 2504 of the subscription array 2500. The subscription array 2500 is stored in the subscription list 1702 to represent the predetermined category addresses for a each predetermined service address 1704.

Specifically, as shown in this first example, the first sub-field 2402 comprises 2 bits of information which corresponds to the first dimension 2502 of the array 2500 comprising four rows (labeled 0 to 3) for the array 2500 in the subscription list 1702. The second sub-field 2404 comprises 3 bits of information which corresponds to the second dimension 2504 of the array 2500. The second dimension 2504 comprises 8 columns (labeled 0 to 7). Hence, in this approach of decoding a received category address 1802, the category address 1802 would be represented by a status marker, such as a bit of information 2506, located within the array 2500 in the subscription list 1702.

When the status marker (bit) 2506 is set to a predetermined value, such as the number 1, it indicates that the particular communication receiver 106 is currently subscribing to that specific subscription from the information service provider. Of course, the bit 2506 could alternatively be set to zero as an indication of an affirmative subscription. Therefore, once a subscription matrix 2500 is configured to a predetermined set of status markers in the subscription list 1702, a received category address 1802 can be quickly verified as to whether that subscription is enabled or disabled for the particular communication receiver 106 by utilizing the first and second sub-fields 2402, 2404, to address the rows 2502 and the columns 2504 of the subscription matrix 2500.

For example, with the 5 bit category address 1802 being masked in a register of a microprocessor, 3 shifts to the least significant bit of the register would locate field one 2402 at the least significant bits of the register. This would identify the row 2502, i.e., the byte, which contains the subscription status marker (bit) for the particular subscription. Next, by masking the second sub-field 2404 in a register of a microprocessor, it would quickly identify the respective bit in that byte which represents the status of that category address for the communication receiver 106. If that bit is set to a predetermined value, such as 1, then the communication receiver 106 has subscribed to the particular subscription. Consequently, the computation to determine subscription to a particular service is very quick and efficient for conventionally available microprocessors.

In summary, the address correlator 830 can utilize the first and second sub-fields, 2402, 2404, of the received category address 1802 to quickly locate a status marker in the subscription matrix 2500. The location of the status marker in the subscription matrix 2500 is indicated by a traversal of the subscription matrix in the first dimension, e.g., the rows, corresponding to the value of the first sub-field 2402 and a traversal of the subscription matrix 2500 in the second dimension, e.g., the columns, corresponding to the value of the second sub-field 2404. The address correlator 830 can then determine the match or lack thereof by whether the status marker 2506 indicates an enabled or disabled subscription status, respectively.

As a second example, as shown in FIGS. 26 and 27, the address code word 1800 has the received category address 1802 comprising 10 bits of information (approximately 1,000 subscriptions available). The received category address 1802 is partitioned into 2 sub-fields 2602, 2604. The first sub-field 2602 comprises 7 bits of information and the second sub-field 2604 comprises 3 bits of information. Hence, the subscription matrix 2700 can be organized as having 128 rows 2702 by 8 columns 2704, as shown. That is, 128 bytes of information would be sufficient to represent approximately 1,000 subscriptions for a communication receiver 106.

Here, a 128 byte subscription matrix 2700 would be associated with each predetermined service address 1704 in the subscription list 1702. A similar method as discussed above could be used to process the sub-fields 2602, 2604, of a received category address 1802 to address rows 2702 and columns 2704 of the subscription array 2700 to determine whether a particular bit in the array 2700 is set to a predetermined value, e.g., set to the number one. Hence, even with a very large number of subscriptions, such as one thousand subscriptions, a communication receiver 106 can quickly and efficiently determine whether a received category address matches with a predetermined category address or subscription in the subscription list 1702. The representation of category addresses in a subscription array 2700 is a very efficient way of organizing the subscription list 1702 in the code memory 822 which tends to conserve memory. It also enhances the operational speed of the address detection process which allows conventional microprocessor technology to be used to process very large numbers of subscription addresses in real time. This, of course, helps reduce the overall product cost for a communication receiver 106, which is important in this very competitive and cost sensitive market.

Additionally, because the subscription matrix organization makes it possible for the address correlator 830 to quickly and efficiently determine whether the received subscription address matches one of the predetermined subscriptions stored in the subscription list 1702, it helps reduce the amount of time and raw operational power required to determine whether the received subscription address matches any one of, say, up to one thousand predetermined subscription addresses stored in memory 822. This, of course, tends to conserve power and extend battery life, as well as make it feasible for a communication receiver 106 to subscribe to a very large number of subscriptions from one or more information service providers while being economical to manufacture and to provide to consumers.

In summary, by performing the comparisons between a received subscription address and a number of predetermined subscription addresses during the detection of the address code word 1800, and not later during the long data portion of the message, the communication receiver 106 can significantly enhance battery life over known information service addressing schemes. Further, the present addressing protocol for a distributed information system enables the communication receiver 106 to selectively receive a very large number of different information subscriptions while maximizing the communication receiver's operational battery life, which is a significant advantage over known information service communication systems.

What is claimed is:

1. A method for decoding a transmitted message in a communication receiver assigned at least one predetermined subscription address comprising a predetermined service address including at least one predetermined category address associated therewith, the transmitted message comprising an address portion and an associated data portion, the address portion including a subscription address comprising an address code word comprising a service address and a category address, said method comprising the steps of:

(a) receiving the address code word within the transmitted message;

(b) generating a corrected address code word by correcting up to a predetermined number of bit errors in the address code word received, and providing an indication of a successful or failed correction of the address code word;

(c) conserving power in the communication receiver during at least one of the following:
  (1) until a subsequent address code word is expected to be received, and
  (2) during the associated data portion of the transmitted message, following a failed correction of the address code word in step (b);

(d) comparing the service address of the corrected address code word to the predetermined service address to detect a match therebetween following a successful correction of the address code word in step (b);

(e) comparing the category address of the corrected address code word to the at least one predetermined category address associated with the predetermined service address that matches the service address of the corrected address code word in step (d) to detect a match between the category address and the at least one predetermined category address associated with the predetermined service address; and further (f) conserving power in the communication receiver during at least one of the following:
  (1) during the associated data portion of the transmitted message, following a determination of no match between the service address of the corrected address code word and the predetermined service address in step (d), and
  (2) during the associated data portion of the transmitted message, following a determination of no match between the category address of the corrected address code word and the at least one predetermined category address in step (e).

2. The method of claim 1, wherein the at least one predetermined category address associated with predetermined service address is organized in a subscription matrix such that the at least one predetermined category address is represented in the subscription matrix by a status marker indicating an enabled or disabled subscription status therefor, and wherein step (e) comprises the step of:
  (g) comparing the category address of the corrected address code word to the at least one predetermined category address associated with the predetermined service address to detect a match by
    locating a status marker in the subscription matrix at a location indicated by a traversal of the subscription matrix corresponding to a value of the category address of the corrected address code word, and
    then determining a match or lack thereof by whether the status marker indicates an enabled or disabled subscription status, respectively.

3. The method of claim 1, wherein the category address of the corrected address code word comprises first and second sub-fields, and wherein the at least one predetermined category address associated with the predetermined service address is organized in a subscription matrix such that the at least one predetermined category address is represented in the subscription matrix by a status marker indicating an enabled or disabled subscription status therefor, and wherein the subscription matrix comprises first and second dimensions corresponding with the first and second sub-fields, respectively, and wherein step (e) comprises the step of:
  (h) comparing the category address of the corrected address code word to the at least one predetermined category address associated with the predetermined service address to detect a match by
    locating a status marker in the subscription matrix at a location indicated by a traversal of the subscription matrix in the first dimension corresponding to a value of the first sub-field and with a traversal of the subscription matrix in the second dimension corresponding to a value of the second sub-field, and
    then determining a match or lack thereof by whether the status marker indicates an enabled or disabled subscription status, respectively.

4. The method of claim 1, further comprising prior to step (a) the steps of:
  (i) receiving at least a portion of the address portion of the transmitted message;
  (j) correlating the at least a portion of the address portion of the transmitted message to a corresponding at least a portion of at least one predetermined subscription addresses; and (k) conserving power in the communication receiver during at least one of the following:
    (1) until a subsequent address code word is expected to be received, and
    (2) during the associated data portion of the transmitted message, following a failed correlation of the at least a portion of the address portion of the transmitted message to the corresponding at least a portion of the at least one predetermined subscription addresses in step (j).

5. The method of claim 4, wherein the address code word comprises a service address and a category address, and wherein the at least one predetermined subscription address comprises a predetermined service address having at least one predetermined category address associated therewith, and wherein step (j) comprises step (m), and wherein step (k) comprises step (n), as follows:
  (m) correlating the at least a portion of the service address of the address code word of the transmitted message to a corresponding at least a portion of the at least one predetermined service address; and
  (n) conserving power in the communication receiver during at least one of the following:
    (1) until a subsequent address code word is expected to be received, and
    (2) during the associated data portion of the transmitted message, following a failed correlation of the at least a portion of the service address of the address code word of the transmitted message to the corresponding at least a portion of the at least one predetermined service address in step (m).

6. A communication receiver, comprising:
  a memory for storing at least one predetermined subscription address comprising a predetermined service address including at least one predetermined category address associated therewith;
  a receiver for receiving a transmitted message, the transmitted message comprising an address portion and an associated data portion, the address portion including a subscription address comprising an address code word comprising a service address and a category address,
  a partial address correlator coupled to the receiver and the memory for partial correlating the address portion for providing a no match indication when the subscription address and the at least one predetermined subscription address do not match;
  an error corrector coupled to the receiver and the partial address correlator for generating a corrected address code word by correcting up to a predetermined number of bit errors in the address code word of the transmitted message, and for providing a successful error correction indication of a failed error correction indication;
  an address correlator coupled to the receiver, the memory, and the error corrector, the address correlator being responsive to the successful error correction indication for correlating the address code word of the transmitted message by comparing the subscription address of the corrected address code word to the at least one predetermined subscription address, and if a match is not found then providing a no match indication upon determination of one of the following conditions:
    (a) a comparison of the service address of the corrected address code word fails to match the predetermined service address, and
    (b) a comparison of the service address of the corrected address code word matches the predetermined service address, and a comparison of the category address of the corrected address code word fails to match the at least one predetermined category address associated with the predetermined service address;

a controller coupled to the partial address correlator and responsive to the no match indication therefrom, and coupled to the error corrector and responsive to the failed error correction indication therefrom, and coupled to the address correlator and responsive to the no match indication therefrom, the controller generating a battery saving signal at least during the associated data portion of the transmitted message following at least one of the no match indication from the partial address correlator, the failed error correction indication from the error corrector, and the no match indication from the address correlator; and a battery saver circuit coupled to the controller and to the receiver and responsive to the battery saving signal for suspending a supply of power to at least the receiver for conserving power in the communication receiver.

7. The communication receiver of claim 6, wherein the category address comprises first and second sub-fields, and wherein the at least one predetermined category address associated with the predetermined service address is organized in a subscription matrix in the memory such that the at least one predetermined category address is represented in the subscription matrix by a status marker indicating an enabled or disabled subscription status therefor, and wherein the subscription matrix comprises first and second dimensions corresponding with the first and second sub-fields, respectively, and wherein the address correlator determines a no match under condition (b) to provide the no match indication by comparing the category address of the corrected address code word to the at least one predetermined category address associated with the predetermined service address by locating a status marker in the subscription matrix at a location indicated by a traversal of the subscription matrix in the first dimension corresponding to a value of the first sub-field in combination with a traversal of the subscription matrix in the second dimension corresponding to a value of the second sub-field, and then determining a match or lack thereof by whether the status marker indicates an enabled or disabled subscription status, respectively, the address correlator providing the no match indication following a determination that the status marker indicates a disabled subscription status.

* * * * *